(12) United States Patent
Rahman et al.

(10) Patent No.: US 11,824,413 B2
(45) Date of Patent: Nov. 21, 2023

(54) BALANCED WINDING LAYOUTS FOR ELECTRIC MOTORS

(71) Applicant: Rivian IP Holdings, LLC, Plymouth, MI (US)

(72) Inventors: Khwaja Rahman, Troy, MI (US); Dang Dinh Dang, Garden Grove, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 190 days.

(21) Appl. No.: 17/369,068

(22) Filed: Jul. 7, 2021

(65) Prior Publication Data

US 2023/0018571 A1    Jan. 19, 2023

(51) Int. Cl.
*H02K 3/28*    (2006.01)
*H02K 3/16*    (2006.01)

(52) U.S. Cl.
CPC ............. *H02K 3/28* (2013.01); *H02K 3/16* (2013.01)

(58) Field of Classification Search
CPC .................... H02K 3/04–16; H02K 3/28
See application file for complete search history.

(56) References Cited

U.S. PATENT DOCUMENTS

| | | | |
|---|---|---|---|
| 7,622,843 B2 * | 11/2009 | Cai | H02K 3/28 310/179 |
| 2008/0042508 A1 * | 2/2008 | Cai | H02K 3/28 310/426 |
| 2019/0222078 A1 * | 7/2019 | Liang | H02K 15/0414 |
| 2021/0218305 A1 * | 7/2021 | Tang | H02K 3/12 |

* cited by examiner

*Primary Examiner* — Quyen P Leung
*Assistant Examiner* — Minki Chang
(74) *Attorney, Agent, or Firm* — Haley Guiliano LLP

(57) ABSTRACT

A winding arrangement for a stator of an electric motor includes winding hairpins arranged to form one or more phases. The stator includes a plurality of motor teeth forming a plurality of slots each configured to accommodate multiple layers. A first set of winding hairpins spanning of M slots are coupled in series and coupled to a phase lead, and are arranged sequentially in a first azimuthal direction. A jumper is arranged in a layer and is coupled in series with the first set of winding hairpins. A second set of winding hairpins configured to span of M slots are coupled in series between the jumper and a neutral lead. The second set of winding hairpins are arranged sequentially in the opposite azimuthal direction, and along with the first set of winding hairpins and the jumper, form a continuous electrical path between the phase lead and the neutral lead.

20 Claims, 38 Drawing Sheets

BALANCED WINDING LAYOUTS FOR ELECTRIC MOTORS

INTRODUCTION

The present disclosure is directed to balanced winding layouts for electric motors, and more particularly, to winding layouts having hairpins of a particular span with a reduced number of part variances.

SUMMARY

In some embodiments, the present disclosure is directed to a stator of an electric motor. The stator includes a plurality of motor teeth, a phase lead, a neutral lead, winding hairpins, and a same-layer jumper. The plurality of motor teeth form a plurality of slots configured to accommodate N layers, wherein N is an integer. The phase lead and the neutral lead are arranged in in a first layer of the N layers. A first set of winding hairpins, each configured to achieve a span of M slots, are coupled in series together and also coupled to the phase lead. The first set of winding hairpins are arranged sequentially in a first azimuthal direction. The jumper is arranged between slots of a second layer, and is coupled in series with the first set of winding hairpins. The second set of winding hairpins are each configured to achieve the span of M slots, and are coupled in series between the jumper and the neutral lead. The second set of winding hairpins are arranged sequentially in a second azimuthal direction opposite to the first azimuthal direction. The first set of winding hairpins, the jumper, and the second set of winding hairpins form a continuous electrical path between the phase lead and the neutral lead. In some embodiments, the first layer is a radially outermost layer, and the second layer is a radially innermost layer. In some embodiments, the first layer is a radially innermost layer, and the second layer is a radially outermost layer.

In some embodiments, the jumper is configured to achieve the span of M slots. In some embodiments, the jumper is configured to achieve a shorter span less than the span of M slots. In some embodiments, M is equal to seven slots such that seven stator teeth are arranged between legs of each of the first set of winding hairpins and between legs of each of the second set of winding hairpins. To illustrate, the side of the stator where the hairpins are laid out is referred to as the crown end while the other end of the stator where the hairpins are welded to form a continuous circuit for current flow is referred to as the weld end. In some embodiments, the pitch of the winding on the crown side is seven, while the pitch on the weld side is five. In some embodiments, a pitch of five in the crown side and a pitch of seven on the weld side is used. In some embodiments, an equal pitch is implemented on both the crown side and the weld side (e.g., a pitch of six on either side).

In some embodiments, the plurality of slots include 48 slots and the phase lead, the neutral lead, the first set of winding hairpins, the jumper, and the second set of winding hairpins correspond to a first winding of a first phase. In some such embodiments, the stator includes further windings corresponding to two additional phases.

In some embodiments, the present disclosure is directed to a stator having a plurality of slots and a plurality of phases arranged in the slots. Each phase includes a first set of winding hairpins coupled in series and arranged sequentially in a first azimuthal direction, a second set of winding hairpins coupled in series and arranged sequentially in a second azimuthal direction opposite the first azimuthal direction, and a jumper. Each of the first set of winding hairpins and each of the second set of winding hairpins include a span of M slots. The jumper is arranged in a single layer and is coupled in series with the first set of winding hairpins and with the second set of winding hairpins.

In some embodiments, the first set of winding hairpins, the second set of winding hairpins and the jumper correspond to a first continuous winding, and each phase includes a second continuous winding coupled in parallel with the first continuous winding. In some such embodiments, each second continuous winding includes a third set of winding hairpins coupled in series and arranged sequentially in the first azimuthal direction, a fourth set of winding hairpins coupled in series and arranged sequentially in the second azimuthal direction, and another jumper. Each of the third set of winding hairpins and each of the fourth set of winding hairpins include a span of M slots. The other jumper arranged in a single layer and is coupled in series with the third set of winding hairpins and with the fourth set of winding hairpins.

In some embodiments, the jumper is configured to achieve the span of M slots, and the additional jumper is configured to achieve a shorter span of less than M slots. In some embodiments, M is equal to seven slots such that seven stator teeth are arranged between legs of each first set of winding hairpins and between legs of each second set of winding hairpins. In some embodiments, the single layer is a radially outermost layer. In some embodiments, the single layer is a radially innermost layer.

In some embodiments, the plurality of phases includes three phases, wherein each phase of the three phases includes at least two windings coupled in parallel. The first set of winding hairpins, the second set of winding hairpins, and the jumper are included in a first winding of the at least two windings, for example.

In some embodiments, the present disclosure is directed to stator of an electric motor including a plurality of stator teeth, a plurality of winding hairpins, a plurality of jumper hairpins, and a jumper. The plurality of stator teeth form a plurality of slots, each configured to accommodate N layers, wherein N is an even integer. Each of the plurality of winding hairpins is configured to achieve a span, and includes N/2 subsets of winding hairpins, each subset of the N/2 subsets including a respective length corresponding to the span. Each of the plurality of jumper hairpins is configured to achieve the span. The plurality of jumper hairpins include N/2-1 subsets of jumper hairpins, and each subset of the N/2-1 subsets includes a respective length corresponding to the span. The jumper is arranged in a single layer of the N layers. The plurality of winding hairpins, the plurality of jumper hairpins, and the jumper are coupled in series to form a continuous electrical path of a phase.

In some embodiments, the single layer is a radially outermost layer. In some embodiments, the single layer is a radially innermost layer. In some embodiments, the jumper is configured to achieve the span. In some embodiments, the jumper is configured to achieve a short span less than the span.

In some embodiments, the plurality of winding hairpins, the plurality of jumper hairpins, and the jumper form a sequence, wherein the jumper is arranged at the center of the sequence, and wherein the jumper corresponds to a change in azimuthal winding direction of the plurality of winding hairpins and the plurality of jumper hairpins.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
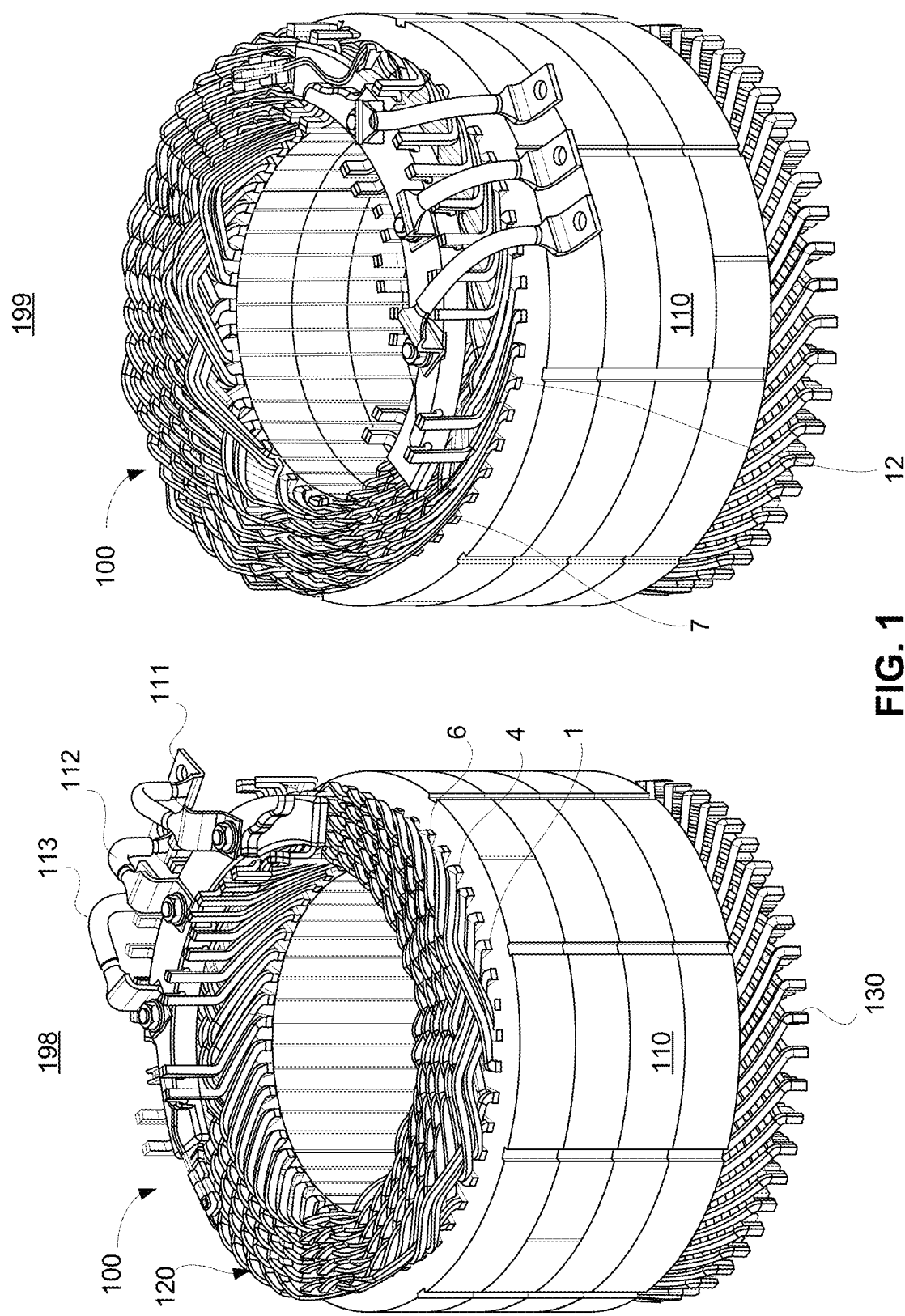
FIG. 1 shows two perspective views of an illustrative motor stator with ten layers having balanced windings, in accordance with some embodiments of the present disclosure.

The present disclosure is directed to balanced winding layouts for electric motors. Electric vehicles, for example, may require motors exhibiting high torque and power for fast acceleration (e.g., especially for higher end vehicles). In a further example, as larger vehicles, such as Trucks and SUVs are electrified, the electric motors require increased torque and power. High power motors may require an increased number of windings connected in parallel (e.g., depending on the level of motor power). To illustrate, more parallel winding connections often require hairpins (e.g., in bar wound machines), resulting in multiple pitches per layer. Winding pitch (or "span") refers to the number of slots one leg of hairpin is from the other leg of the hairpin. For example, a hairpin may extend a "full pitch," which means the number of slots the hairpin covers is equal to number of slots divided by number of poles (e.g., typically an integer for integral slot machines). Conversely, the winding pitch can be "short" in which case the number of slots covered by the hairpin is less than the full pitch winding. Further, the winding pitch can be "long," in which case the number of slots covered by the hairpin is greater than the full pitch. Many winding arrangements, when connecting windings in parallel, require hairpins in every layer to make several pitches: standard pitch (full pitch); short pitch; and (sometimes) long pitch.

The number of layers in a winding layout is defined by the number of conductors in each slot (e.g., stacked radially). In some arrangements, every conductor constitutes one layer. For example, a winding layout with 4 or 6 conductors per slot may have 4 or 6 layers of winding respectively. In some arrangements, parallel connections require a larger number of hairpin shapes (e.g., different pitches) in order to balance windings that are connected in parallel with each other. For example, several hairpin shapes may be required in order to balance these parallel windings such that the same phase (angle) is maintained with respect to each winding. To achieve the same angular phase, each winding should occupy the same location of the slot with respect to the winding pole an equal number of times. Achieving this can necessitate several shapes of hairpins for different layer pairs. As the number of required hairpin shapes increases, stator manufacturing can become more complicated (e.g., requiring more toolings with the associated tooling cost and longer cycle time), which can affect product cost and manufacturing time, and thus productivity. Balanced windings, as used herein, refer to the clockwise and counterclockwise oriented hairpin sequences used for each winding of a phase.

In some embodiments, the winding layouts of the present disclosure allow a balanced winding with a large number of coils connected in parallel and with a reduced numbers of hairpin shapes, thereby reducing the unit and production cost. Each pair of layers can include two sets of windings: a first set (referred to herein as a forward winding) is wound in the forward direction (e.g., azimuthal) around the stator to complete the winding and a second set (referred to herein as a reverse winding) is wound in the reverse direction (e.g., in the opposite azimuthal direction of the forward winding). In some arrangements, the forward winding and the reverse windings are balanced individually and are then connected in parallel (e.g., for increased power). However, this approach may require many hairpin shapes (e.g., hairpins having different spans), thus increasing the cost. In winding layouts of the present disclosure, the forward and reverse windings are not connected in parallel, but rather the forward and reverse windings are connected in series. For example, the forward and reverse windings of the present disclosure may either occupy all the slots in a layer or partially occupy the slots in every layer (e.g., depending on the number of parallel connections). As set forth in more detail with regards to the examples below, a forward winding can be connected (e.g., via a same-layer jumper) to a reverse winding, the forward and reverse windings complementing each other to make the winding fully balanced. The approach of the present disclosure utilizes standard shapes (e.g., full pitch hairpin) in layer pairs, thus reducing the number of different shapes in the winding layouts. For example, a same winding layout can apply to all of the forward winding, and after a same-layer jump, is connected to the reverse winding having a same or similar winding layout. The combination of the forward and the reverse windings can make the winding fully balanced, reducing the number of hairpin shapes.

Figure 2:
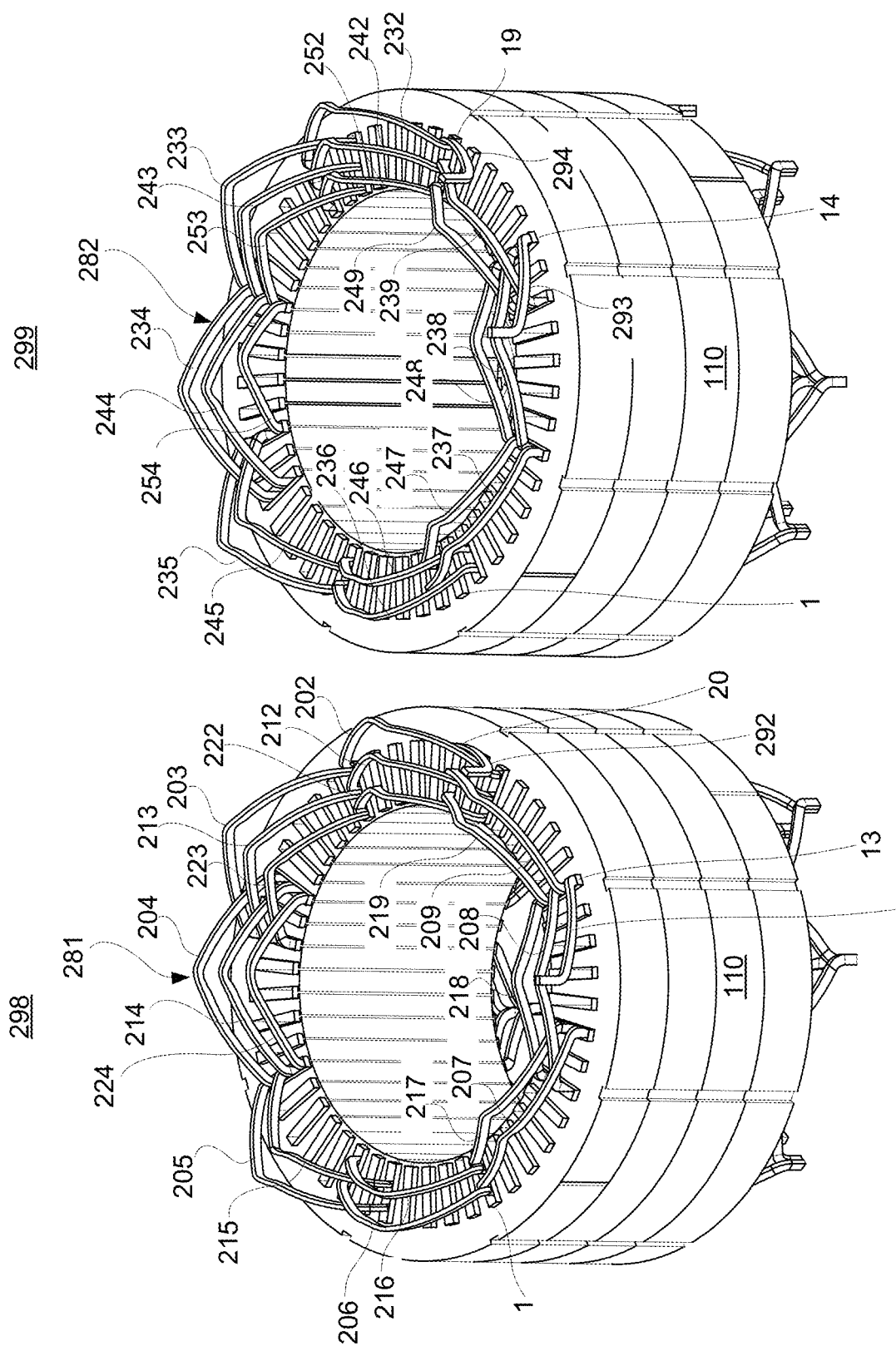
FIG. 2 shows two perspective views of the illustrative motor stator of FIG. 1 with only windings for two respective parallel phase windings installed, in accordance with some embodiments of the present disclosure.
Figure 3:
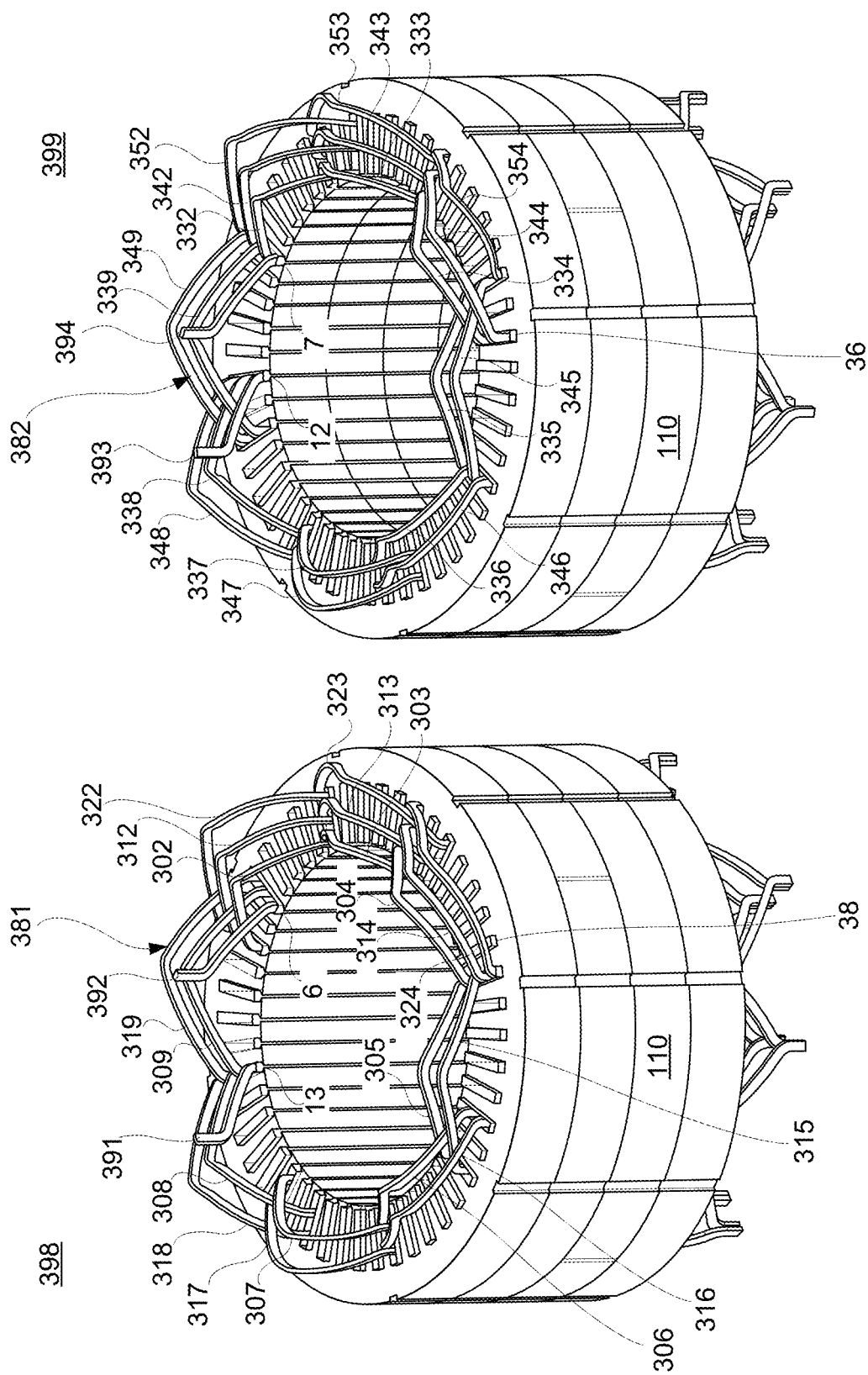
FIG. 3 shows two perspective views of the illustrative motor stator of FIG. 1 with only windings for two further respective parallel phase windings installed, in accordance with some embodiments of the present disclosure.
Figure 4:
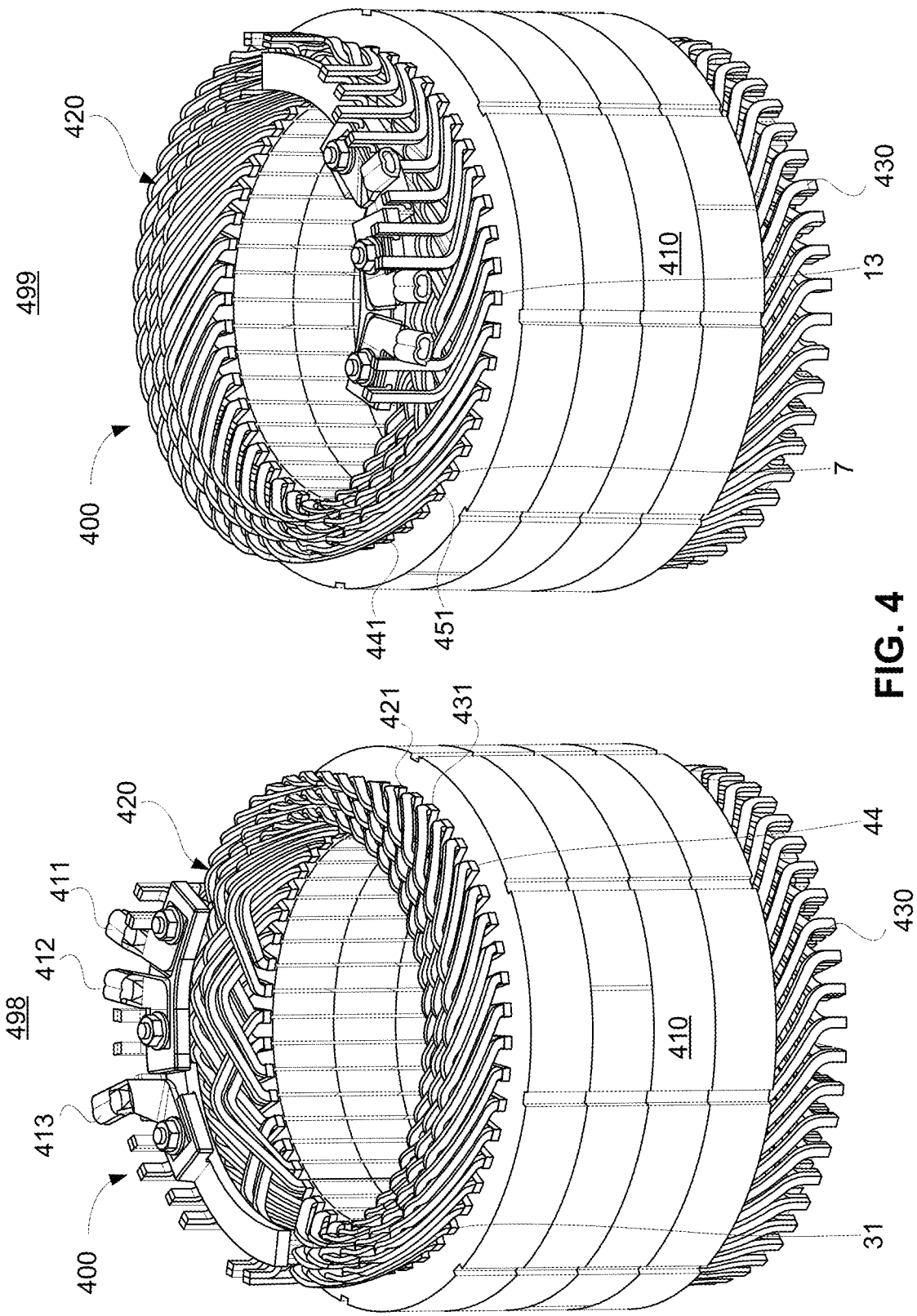
FIG. 4 shows two perspective views of an illustrative motor stator with six layers having balanced windings, in accordance with some embodiments of the present disclosure.
Figure 5:
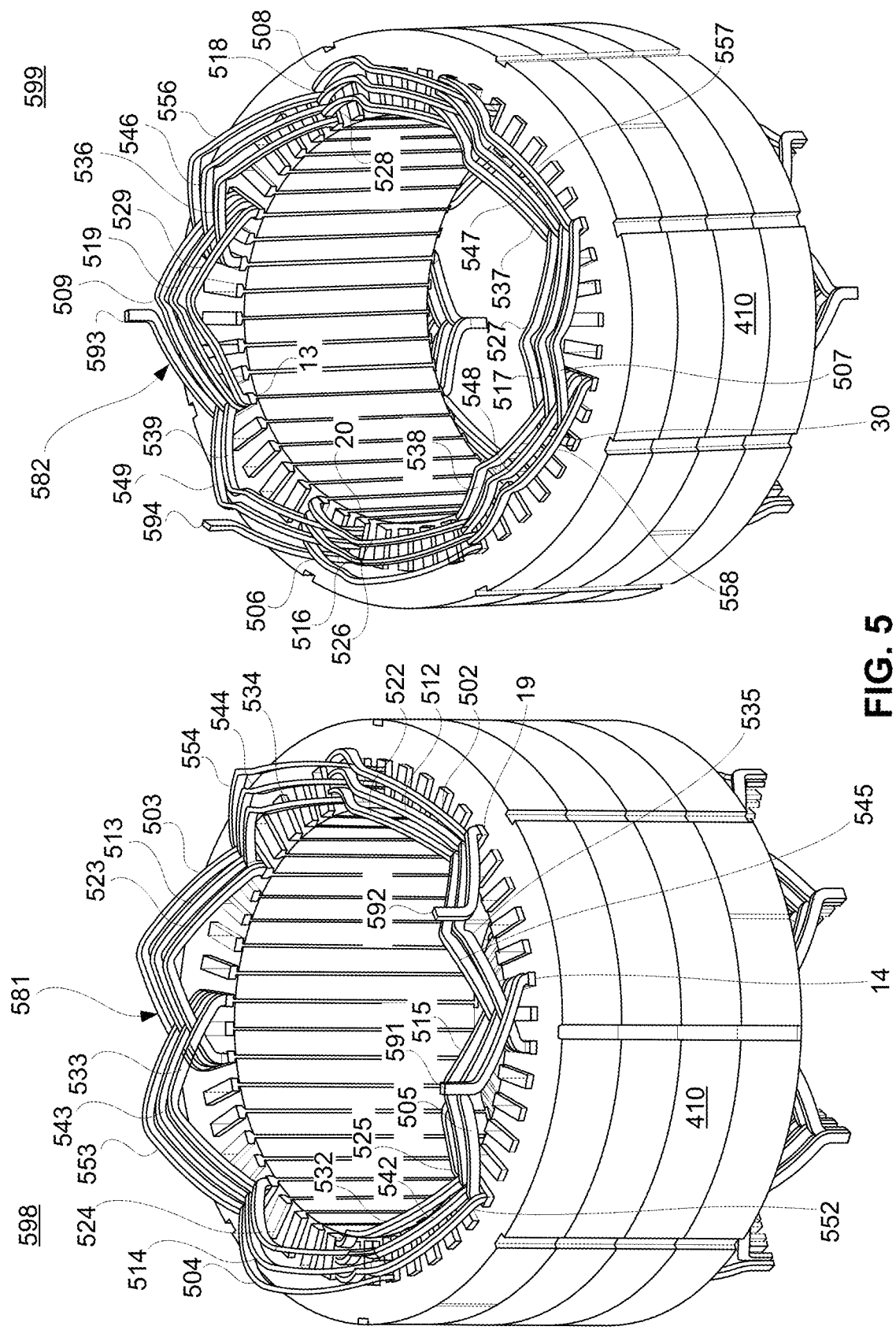
FIG. 5 shows two perspective views of the illustrative motor stator of FIG. 4 with only windings for two respective parallel phase windings installed, in accordance with some embodiments of the present disclosure.

An illustrative 10-layer stator is illustrated in FIGS. 1-3, and an illustrative 6-layer stator is illustrated in FIGS. 4-5. Several windings of each stator are illustrated in an isolated arrangement for purposes of clarity, and accordingly, FIGS. 2-3 and 5 may be considered partial assemblies.

FIG. 1 shows two perspective views (e.g., panels 198 and 199) of an illustrative motor stator 100 with ten layers having balanced windings, in accordance with some embodiments of the present disclosure. The views shown in panels 198 and 199 are shown from different sides of the stator (e.g., rotated about 120 degrees relative to each other). Terminals 111, 112, and 113 are configured to be coupled to respective phases (e.g., A, B, and C) of the motor (e.g., three-phase, four-pole as illustrated). Stator body 110 includes a plurality of slots (e.g., 48 slots as illustrated, with slots 1, 4 and 6 indicated, arranged between a plurality of stator teeth. A plurality of hairpins 120 are arranged in the slots (e.g., meeting each other at welds 130). For example, as illustrated, hairpins 120 are configured to be inserted axially into slots, wherein each hairpin includes one or two legs which correspond to respective slots. For example, a hairpin of hairpins 120 may include two legs configured to fit into two respective slots (i) at a radial position (e.g., the two legs configured to fit in a first layer and second layer, respectively, forming a layer pair such as 1-2, 3-4, 5-6, 7-8, 9-10), and (ii) across a predetermined pitch (e.g., number-of-slots width of the hairpin). Illustrative windings B1, B2, B3, and B4 are shown in isolation for purposes of clarity in FIGS. 2-3, and an illustrative wiring schematic of some phases of motor stator 100 is shown in FIGS. 11A-11F (e.g., for four parallel windings B1, B2, B3, and B4). In some embodiments, hairpins 120 include standard hairpins (e.g., hairpins having a common shape) extending across a span and layer pair, and a same-layer winding jumper to connect forward windings with reverse direction windings. Accordingly, stator 100 may reduce the number of wire (e.g., hairpin) shapes, which may reduce tooling cost and improve production cycle time.

FIG. 2 shows two perspective views (e.g., panels 298 and 299) of illustrative motor stator 100 of FIG. 1 with only winding for two respective parallel windings installed (e.g., winding B1 in panel 298 and winding B2 in panel 299), in accordance with some embodiments of the present disclosure. The views shown in panels 298 and 299 are shown from the same side of the stator. For example, panel 298 illustrates a winding 281 (e.g., winding B1), and panel 299 illustrates a winding 282 (e.g., winding B2), which is connected in parallel with the winding 281 shown in panel 298. FIG. 3 shows two perspective views (e.g., panels 398 and 399) of illustrative motor stator 100 of FIG. 1 with only windings for two further respective parallel windings 381 and 382 installed (e.g., winding B3 in panel 398 and winding B4 in panel 399) in accordance with some embodiments of the present disclosure. The views shown in panels 398 and 399 are shown from the same side of the stator (e.g., and rotated about 150 degrees from those shown in FIG. 2). For example, panel 398 illustrates a winding 381, and panel 399 illustrates a winding 382 connected in parallel with windings 281 and 282. In the examples shown in FIG. 2 and FIG. 3, windings 281, 282, 381, and 382 (e.g., windings B1, B2, B3, and B4 of phase B) are connected in parallel with each other to form the winding of phase B. As illustrated in FIG. 2, slots 1, 13 and 20 are indicated by lead lines in panel 298, and slots 1, 14, and 19 are indicated by lead lines in panel 299.

Referencing panel 298 showing winding 281, winding lead 291 enters slot 13 ("slot 13" of 48 slots) at layer 10 (i.e., the outermost layer) from the lead side (e.g., axially, at the top as illustrated), with the hairpins of winding 281 forming a continuous path to neutral lead 292 (e.g., at slot 20, as illustrated). As illustrated in panel 298 of FIG. 2, the hairpins of winding 281 include:

Layer 10 phase lead (hairpin 291);
Layer 10 neutral lead (hairpin 292);
Layer 9-10 regular hairpins (hairpins 202 and 203);
Layer 7-8 regular hairpins (hairpins 206 and 207);
Layer 5-6 regular hairpins (hairpins 212 and 213);
Layer 3-4 regular hairpins (hairpins 216 and 217);
Layer 1-2 regular hairpins (hairpins 222 and 223);
Layer 8-9 jumpers (hairpins 204 and 205);
Layer 6-7 jumpers (hairpins 208 and 209);
Layer 4-5 jumpers (hairpins 215 and 214);
Layer 2-3 jumpers (hairpins 218 and 219); and
Layer 1-1 jumper (hairpin 224, having the same span as the other hairpins of phase B1).

The current path of phase B1 follows, in sequential order, hairpins 291 (lead), 202, 204, 206, 208, 212, 214, 216, 218, 222, 224 (e.g., where winding direction changes from counter-clockwise to clockwise), 223, 219, 217, 215, 213, 209, 207, 205, 203, and 292 (neutral). As illustrated, each of the two-leg hairpins of winding B1 have a span of 7.

Referencing panel 299 showing winding 282, winding lead 293 enters slot 14 at layer 10 from the lead side (e.g., axially, at the top as illustrated), with the hairpins of winding 282 forming a continuous path to neutral lead 294 (e.g., at slot 19, as illustrated). The hairpins of winding 282 include:

Layer 10 phase lead (hairpin 293);
Layer 10 neutral lead (hairpin 294);
Layer 9-10 regular hairpins (hairpins 232 and 233);
Layer 7-8 regular hairpins (hairpins 236 and 237);
Layer 5-6 regular hairpins (hairpins 242 and 243);
Layer 3-4 regular hairpins (hairpins 246 and 247);
Layer 1-2 regular hairpins (hairpins 252 and 253);
Layer 8-9 jumpers (hairpins 234 and 235);
Layer 6-7 jumpers (hairpins 238 and 239);
Layer 4-5 jumpers (hairpins 245 and 244);
Layer 2-3 jumpers (hairpins 248 and 249); and
Layer 1-1 jumper (hairpin 254, with a shorter span than the other hairpins of winding B2).

The current path of winding 282 follows, in sequential order, hairpins 293 (lead), 232, 234, 236, 238, 242, 244, 246, 248, 252, 254 (e.g., where winding direction changes from counter-clockwise to clockwise), 253, 249, 247, 245, 243, 239, 237, 235, 233, and 294 (neutral). All of the two-leg hairpins of phase B1 have a span of 7, except hairpin 254 (e.g., 1-1 jumper) with a span of 5, as illustrated.

Referencing panel 398 showing winding 381 (i.e., winding 381), winding lead 391 enters slot 13 at layer 1 from the lead side (e.g., axially, at the top as illustrated), with the hairpins of winding 381 forming a continuous path to neutral lead 392 (e.g., at slot 6, as illustrated). The hairpins of winding 381 include:

Layer 1 phase lead (hairpin 391);
Layer 1 neutral lead (hairpin 392);
Layer 9-10 regular hairpins (hairpins 322 and 323);

Layer 7-8 regular hairpins (hairpins 316 and 317);
Layer 5-6 regular hairpins (hairpins 312 and 313);
Layer 3-4 regular hairpins (hairpins 306 and 307);
Layer 1-2 regular hairpins (hairpins 302 and 303);
Layer 8-9 jumpers (hairpins 318 and 319);
Layer 6-7 jumpers (hairpins 314 and 315);
Layer 4-5 jumpers (hairpins 308 and 309);
Layer 2-3 jumpers (hairpins 304 and 305); and
Layer 10-10 jumper (hairpin 324, having the same span as the other hairpins of phase B3).

The current path of phase 381 follows, in sequential order, hairpins 391 (lead), 302, 304, 306, 308, 312, 314, 316, 318, 322, 324 (e.g., where winding direction changes from clockwise to counter-clockwise), 323, 319, 317, 315, 313, 309, 307, 305, 303, and 392 (neutral). All of the two-leg hairpins of winding 381 have a span of 7, as illustrated.

Referencing panel 399 showing winding B4 (i.e., winding 382), winding lead 393 enters slot 12 at layer 1 from the lead side (e.g., axially, at the top as illustrated), with the hairpins of winding 382 forming a continuous path to neutral lead 394 (e.g., at slot 7, as illustrated). The hairpins of winding B4 include:

Layer 1 phase lead (hairpin 393);
Layer 1 neutral lead (hairpin 394);
Layer 9-10 regular hairpins (hairpins 352 and 353);
Layer 7-8 regular hairpins (hairpins 346 and 347);
Layer 5-6 regular hairpins (hairpins 342 and 343);
Layer 3-4 regular hairpins (hairpins 336 and 337);
Layer 1-2 regular hairpins (hairpins 332 and 333);
Layer 8-9 jumpers (hairpins 348 and 349);
Layer 6-7 jumpers (hairpins 344 and 345);
Layer 4-5 jumpers (hairpins 338 and 339);
Layer 2-3 jumpers (hairpins 334 and 335); and
Layer 10-10 jumper (hairpin 354, with a shorter span than the other hairpins of winding B4).

The current path of winding 382 follows, in sequential order, hairpins 393 (lead), 332, 334, 336, 338, 342, 344, 346, 348, 352, 354 (e.g., where winding direction changes from clockwise to counter-clockwise), 353, 349, 347, 345, 343, 339, 337, 335, 333, and 394 (neutral). All of the two-leg hairpins of winding 382 have a span of 7, except hairpin 354 (e.g., 10-10 jumper) with a span of 5, as illustrated.

Accordingly, for windings 281, 282, 381, and 382 (i.e., windings B1-B4), it can be summarized that:

first set of hairpins 202, 203, 232, 233, 322, 323, 352, and 353 are the same;
second set of hairpins 206, 207, 236, 237, 316, 317, 346, and 347 are the same;
third set of hairpins 212, 213, 242, 243, 312, 313, 342, and 343 are the same;
fourth set of hairpins 216, 217, 246, 247, 306, 307, 336, and 337 are the same;
fifth set of hairpins 222, 223, 252, 253, 302, 303, 332, and 333 are the same;
jumpers 204, 205, 234, 235, 318, 319, 348, and 349 are the same;
jumpers 208, 209, 238, 239, 314, 315, 344, and 345 are the same;
jumpers 214, 215, 244, 245, 308, 309, 338, and 339 are the same;
jumpers 218, 219, 248, 249, 304, 305, 334, and 335 are the same;
jumper 224 is unique;
jumper 254 is unique;
jumper 324 is unique;
jumper 354 is unique;
leads 291 and 293 are the same;
leads 292 and 294 are the same;
leads 391 and 393 are the same; and
leads 392 and 394 are the same, as summarized in Table 1, below.

TABLE 1

Tabulation of number of unique components required (10-layer).

| Hairpin Type | Number | Notes |
| --- | --- | --- |
| Regular | 5 | (five sizes for radial position differences) |
| Jumper | 4 | (layer 9-8, 7-6, 5-4, 3-2 jumps) |
| Jumper | 4 | (5-slot 1-1, 7-slot 1-1, 5-slot 10-10, 7-slot 10-10 jumps) |
| Phase | 2 | (layer-1 phase lead, layer-10 phase lead) |
| Neutral | 2 | (layer-1 neutral lead, layer-10 neutral lead) |
| Total | 17 | |

As shown in this example, two of the 4 parallel paths of windings of phase B (e.g., windings B1, B2, illustrated in FIG. 2) start on the outside at layer 10 and wind clockwise until the inside is reached at layer 1 where the winding direction changes. The other two parallel paths of phase B (e.g., windings B3, B4 illustrated in FIG. 3) start on the inside at layer 1 and wind clockwise until the outside is reached at layer 10 where the winding direction changes.

FIG. 4 shows two perspective views (e.g., panels 498 and 499) of illustrative motor stator 400 with six layers having balanced windings, in accordance with some embodiments of the present disclosure. The views shown in panels 498 and 499 are shown from opposite sides of the stator (e.g., rotated about 180 degrees relative to each other). Motor stator 400, as illustrated, corresponds to a 3-phase, 8-pole motor, although it will be understood the arrangements of the present disclosure may be applied to any suitable electric motor having any suitable number of slots, poles, phases, and layers. Terminals 411, 412, and 413 are configured to be coupled to respective phases (e.g., A, B, and C) of the motor (e.g., three-phase, eight-pole as illustrated). Stator body 410 includes a plurality of slots (e.g., 48 slots as illustrated, with line 421 showing slot 1, line 431 showing slot 47, line 441 showing slot 3, and line 451 showing slot 6), arranged between a plurality of stator teeth. A plurality of hairpins 420 are arranged in the slots (e.g., meeting each other at welds 430). For example, as illustrated, hairpins 420 are configured to be inserted axially into slots (e.g., and welded on the opposite axial side from insertion, as illustrated by welds 430), wherein each hairpin includes one or two legs which correspond to respective slots. For example, a hairpin of hairpins 420 may include two legs configured to fit into two respective slots (i) at a radial position (e.g., the two legs configured to fit in a first layer and a second layer, respectively, forming a layer pair such as 1-2, 3-4, 5-6), and (ii) across a predetermined pitch (e.g., number-of-slots width of the hairpin).

FIG. 5 shows two perspective views (e.g., panels 598 and 599) of the illustrative motor stator of FIG. 4 with only windings for two respective parallel windings per phase installed (e.g., winding B1 in panel 598 and winding B2 in panel 599), in accordance with some embodiments of the present disclosure. Panel 598 illustrates winding 581 (e.g., winding B1 of phase B), while panel 599 illustrates winding 582 (e.g., winding B2 of phase B), wherein windings 581 and 582 are connected in parallel to form the winding of phase B. An illustrative wiring schematic of some phases of motor stator 400 is shown in FIG. 12 (e.g., for windings 581 and 582). The views shown in panels 598 and 599 are shown from opposite sides of the stator (e.g., rotated about 180 degrees relative to each other). As illustrated in FIG. 5, slots 14 and 19 are indicated by lead lines in panel 598, and slots 13 and 20 are indicated by lead lines in panel 599.

Referencing panel 598 showing winding 581 (i.e., winding B1), phase lead 591 enters slot 14 at layer 6 from the lead side (e.g., axially, at the top as illustrated). A first set of counter-clockwise hairpins 502, 503, and 504, and jumper 505 extend counter-clockwise around in layers 5 and 6, which continue to second set of counter-clockwise hairpins 512, 513, and 514, and jumper 515 which extend counter-clockwise around in layers 3 and 4, which continue to third set of counter-clockwise hairpins 522, 523, 524, and jumper 525 which extend counter-clockwise around in layers 1 and 2. While hairpins 502-504, 512-514, and 522-524, and jumpers 505 and 515 have the same span (e.g., 7 slots, as illustrated), jumper 525, as illustrated, includes a different span (e.g., 5 slots as illustrated). Jumper 525 is termed a "1-1" jumper because is extends between slots at layer 1 and marks the winding position where the azimuthal winding direction changes (e.g., counter-clockwise winding direction changes to clockwise for winding 581). A third set of clockwise hairpins 532, 533, and 534, and jumper 535 extend clockwise around in layers 1 and 2, which continue to another second set of clockwise hairpins 542, 543, and 544, and jumper 545 which extend clockwise around in layers 3 and 4, which continue to another first set of clockwise hairpins 552, 553, and 554 which extend clockwise around in layers 1 and 2, and continue to neutral lead 592 (e.g., at slot 19, as illustrated). Hairpins 532-534, 542-544, and 552-554, and jumpers 535 and 545 have the same span (e.g., 7 slots, as illustrated). Accordingly, hairpins 502-504 and 552-554 are the same, hairpins 512-514 and 542-544 are the same, and hairpins 522-524 and 532-534 are the same, with each set differing in length (e.g., all have the same span, but the azimuthal distance changes based on layer pairs as the radius changes).

Referencing panel 599 showing winding 582 (i.e., winding B2), phase lead 593 enters slot 13 at layer 6 from the lead side (e.g., axially, at the top as illustrated). A first set of hairpins 506, 507, and 508, and jumper 509 extend counter-clockwise around in layers 5 and 6, which continue to second set of hairpins 516, 517, and 518, and jumper 519 which extend counter-clockwise around in layers 3 and 4, which continue to third set of hairpins 526, 527, 528, and jumper 529 which extend counter-clockwise around in layers 1 and 2. Hairpins 506-508, 516-518, and 526-528, and jumpers 509, 519 and 529 have the same span (e.g., 7 slots, as illustrated). Jumper 529 is also a "1-1" jumper because is extends between slots at layer 1, and marks the winding position where the direction changes (e.g., counter-clockwise to clockwise for winding 582), but includes the same span as the hairpins. Another third set of hairpins 536, 537, and 538, and jumper 539 extend clockwise around in layers 1 and 2, which continue to another second set of hairpins 546, 547, and 548, and jumper 549 which extend clockwise around in layers 3 and 4, which continue to another first set of hairpins 556, 557, and 558 which extend clockwise around in layers 1 and 2, and continue to neutral lead 594 (e.g., at slot 20, as illustrated). Hairpins 536-538, 546-548, and 556-558, and jumpers 539 and 549 have the same span (e.g., 7 slots, as illustrated). Accordingly, for windings 581 and 582, it can be summarized that:

first set of hairpins 502-504, 506-508, 552-554, and 556-558 are the same;

second set of hairpins 512-514, 516-518 542-544, and 546-548 are the same; and third set of hairpins 522-524, 526-528, 532-534, and 536-538 are the same, with each set differing only in length (e.g., all have the same span but the azimuthal distance changes based on layer pairs as the radius changes).

The total number of different shapes of winding hairpins are illustrated in Table 2, below.

TABLE 2

Tabulation of number of unique components required (6-layer).

| Hairpin Type | Number | Notes |
| --- | --- | --- |
| Regular | 3 | (three sizes for radial position differences) |
| Jumper | 2 | (layer 5-4 jump, layer 3-2 jump) |
| Jumper | 2 | (5-slot 1-1 jump, 7-slot 1-1 jump) |
| Phase | 1 | All 6 phase leads are the same |
| Neutral | 1 | All 6 neutral leads are the same |
| Total | 9 | |

Figure 6:
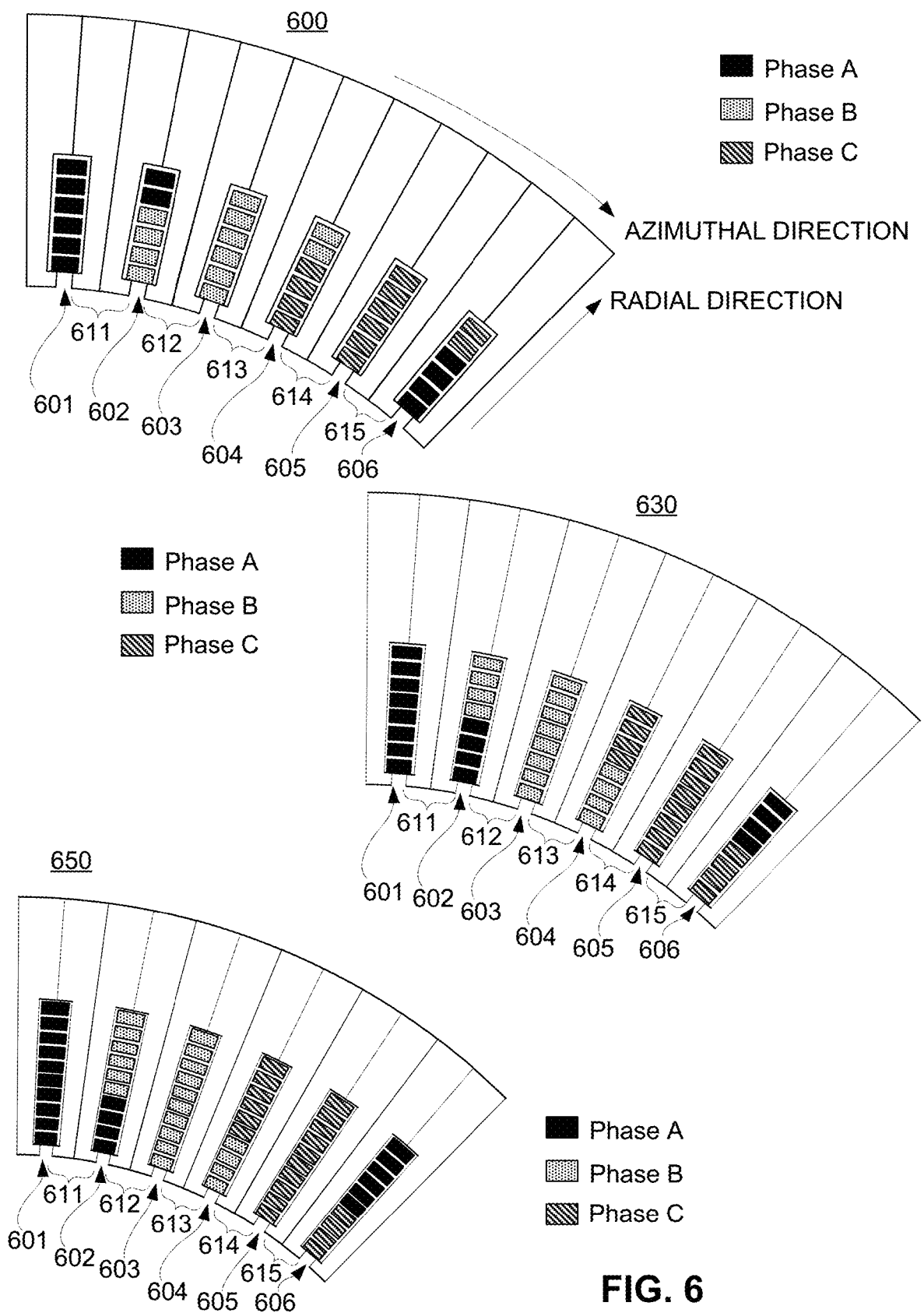
FIG. 6 shows three end views of illustrative slot arrangements having different numbers of conductor layers, in accordance with some embodiments of the present disclosure.

FIG. 6 shows three end views (e.g., panels 600, 630, and 650) of illustrative slot arrangements having different numbers of conductor layers, in accordance with some embodiments of the present disclosure. Panel 600 illustrates a six-conductor per slot arrangement. For reference, the azimuthal direction (e.g., the direction of slot indexing) and radial direction (e.g., direction of layer indexing) are indicated in panel 600, and are oriented similarly in panels 630 and 650. Panel 630 illustrates an eight-conductor per slot arrangement. Panel 650 illustrates a ten-conductor per slot arrangement. In each of panels 600, 630, and 650, several windings are illustrated for three phases (e.g., with parts of phase A repeating, but with the opposite current flow orientation). As illustrated, each arrangement of panels 600, 630, and 650 includes slots 601-606, and stator teeth 611-615 arranged between adjacent slots. In each of panels 600, 630, and 650, several windings are illustrated for three phases (e.g., with parts of phase A repeating, but with the opposite current flow orientation). As illustrated in each of panels 600, 630, and 650, the windings for each phase are distributed between three of the slots shown, where slot is shared with other phases for two of the three slots. As illustrated, windings of Phase A of a first polarity (e.g., current into or out of the page, as illustrated) are included in slots 601 and 602, and windings of Phase A having an opposite polarity are included in slot 606. As illustrated, windings of Phase B of a first polarity are included in slots 602, 603, and 604. As illustrated, windings of Phase C of a first polarity are included in slots 604, 605, and 606. Staggering of the windings between three slots among the layers (e.g., the radial staggering of Phase A windings between slots 601, 602, and 606 in panel 600, and Phases B and C as well) can lower the fifth and the seventh order winding harmonics, resulting in lower torque ripple, which can be a source of motor noise. In some embodiments, not illustrated in FIG. 6, the winding of each phase may be distributed in two slots where there will be no sharing of phases within each of these slots. To illustrate, the latter may be preferred for manufacturing reasons but at the expense of higher spatial harmonics in the motor in some circumstances.

Figure 7:
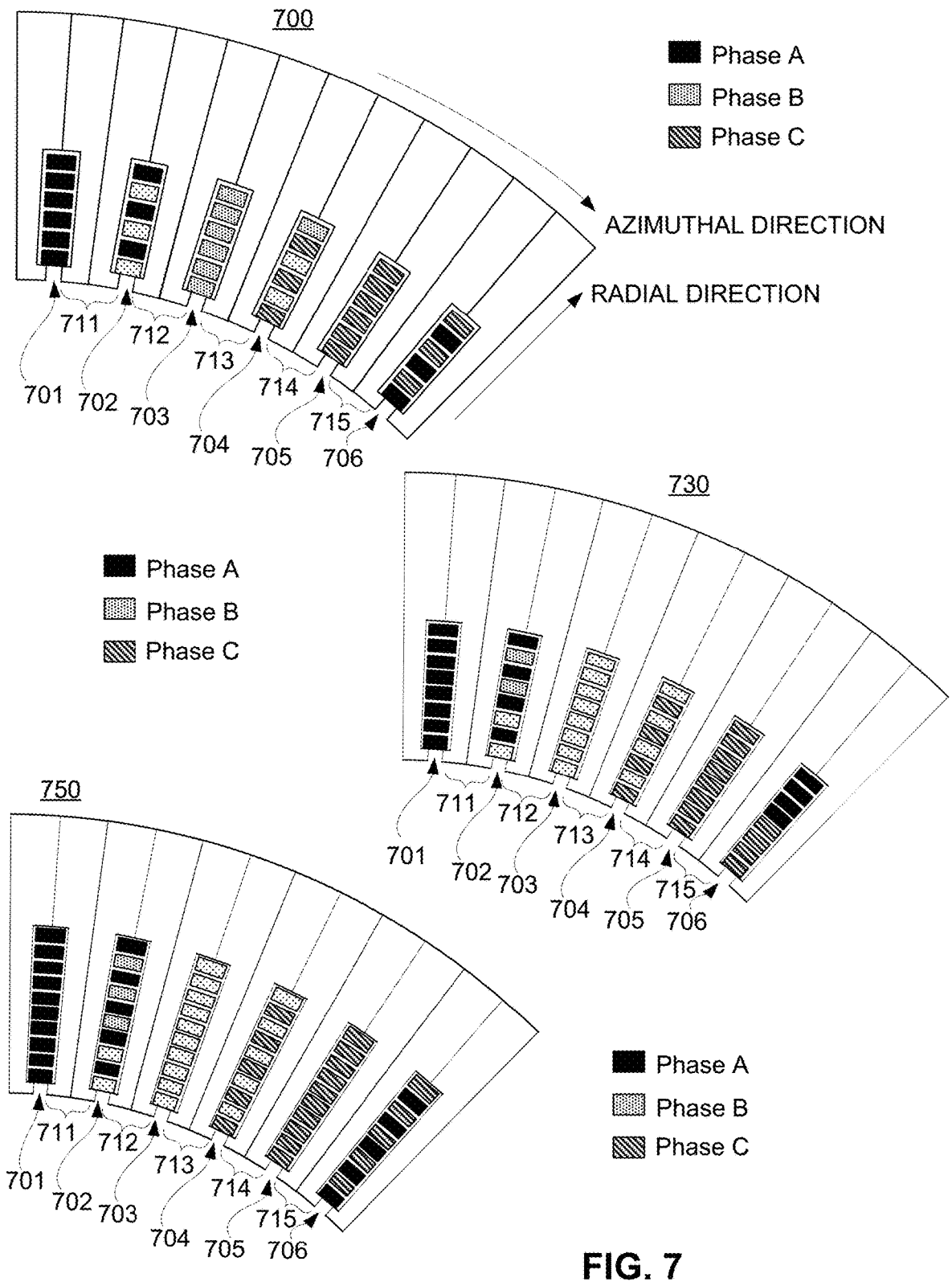
FIG. 7 shows three end views of further illustrative slot arrangements having different numbers of conductor layers, in accordance with some embodiments of the present disclosure.

FIG. 7 shows three end views (e.g., panels 700, 730, and 750) of further illustrative slot arrangements having different numbers of conductor layers, in accordance with some embodiments of the present disclosure. To illustrate, FIGS. 6 and 7 provide illustrative arrangements of windings in slots, in accordance with some embodiments of the present disclosure. For reference, the azimuthal direction (e.g., the direction of slot indexing) and radial direction (e.g., direction of layer indexing) are indicated in panel 700, and are oriented similarly in panels 730 and 750. Panel 700 illustrates a six-conductor per slot arrangement. Panel 730 illustrates an eight-conductor per slot arrangement. Panel 750 illustrates a ten-conductor per slot arrangement. As illustrated, each arrangement of panels 700, 730, and 750 includes slots 701-706, and stator teeth 711-715 arranged between adjacent slots. In each of panels 700, 730, and 750, several windings are illustrated for three phases (e.g., with parts of phase A repeating, but with the opposite current flow orientation). As illustrated in each of panels 700, 730, and 750, the windings for each phase are distributed between three slots where slot is shared with other phases for two of the three slots. As illustrated, windings of Phase A of a first polarity (e.g., current into or out of the page, as illustrated) are included in slots 701 and 702, and windings of Phase A having an opposite polarity are included in slot 706. As illustrated, windings of Phase B of a first polarity are included in slots 702, 703, and 704. As illustrated, windings of Phase C of a first polarity are included in slots 704, 705, and 706. Staggering of the windings between three slots among the layers (e.g., the radial staggering of Phase A windings between slots 701, 702, and 706 in panel 700, and Phases B and C as well) can lower the fifth and the seventh order winding harmonics, resulting in lower torque ripple, which can be a source of motor noise. In some embodiments, the winding of each phase may be distributed in two slots where there will be no sharing of phases within a slot. To illustrate, the latter may be preferred for manufacturing reasons but at the expense of higher spatial harmonics in the motor in some circumstances.

FIGS. 8A-8F, 9A-9F, 10A-10F, 11A-11F, and 12A-12F show illustrative wiring schematics for different sized slots and/or different winding pitches. The wiring schematics of FIGS. 8A-12F are illustrated for forty-eight slot arrangements, with the slot numbers illustrated. The weld side is illustrated as the top side of each layer (see e.g., weld side 820) and the lead side is illustrated as the bottom side of each layer (see e.g., lead side 821).

Figure 8A:
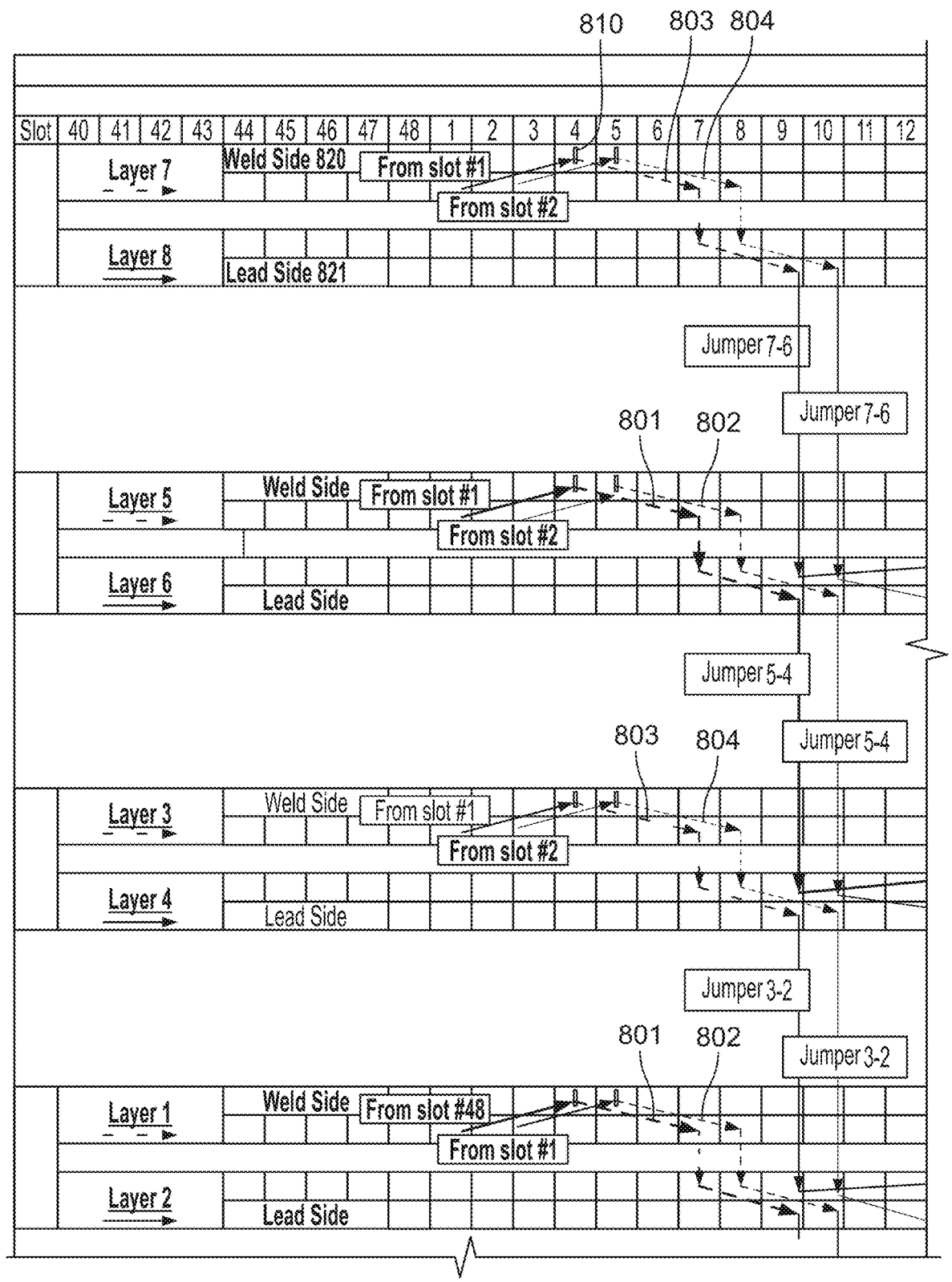
FIGS. 8A-8F show an illustrative wiring schematic corresponding to parallel windings of one phase of an eight-layer stator, with a winding pitch of six slots, in accordance with some embodiments of the present disclosure.
Figure 8B:
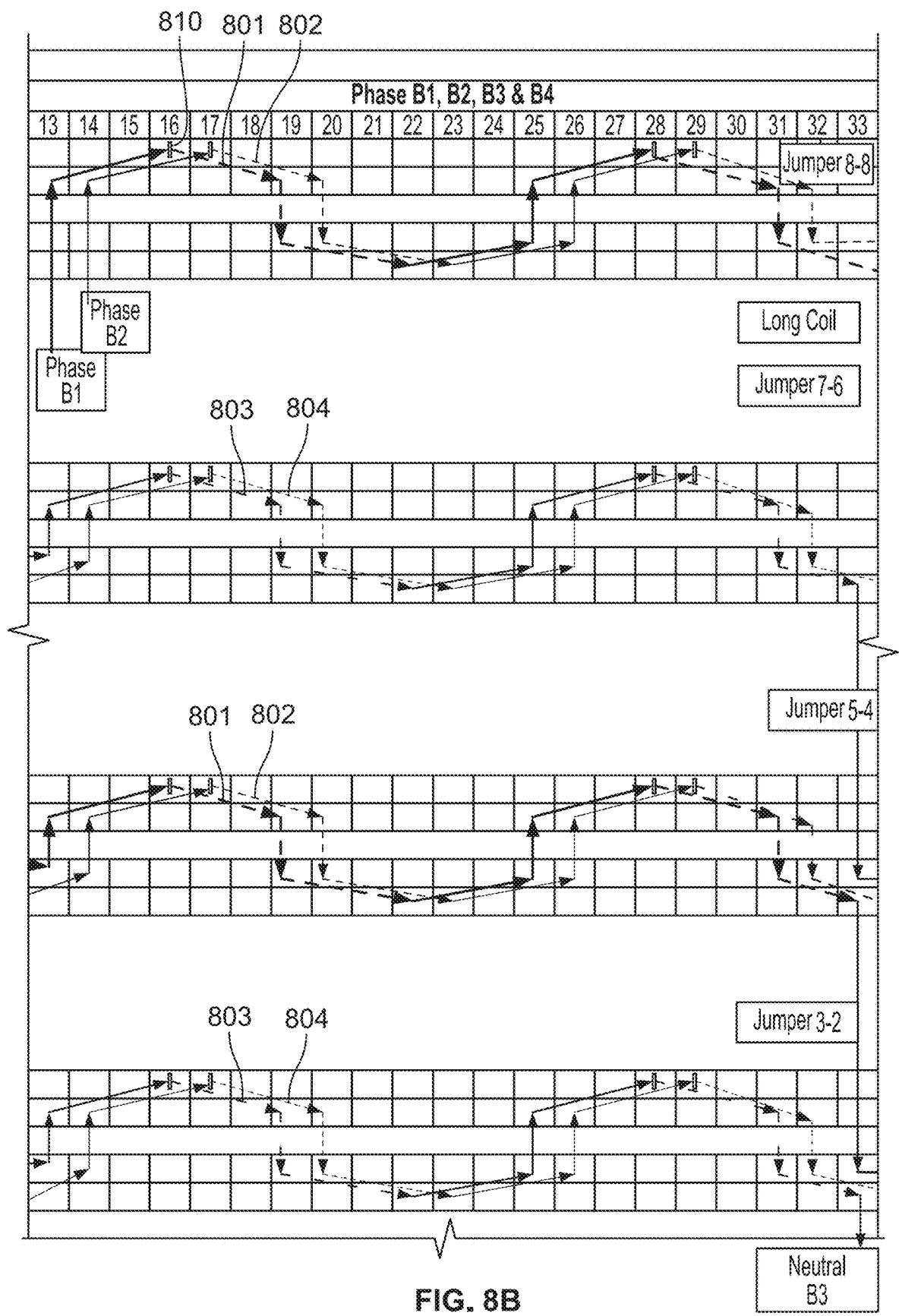
Figure 8C:
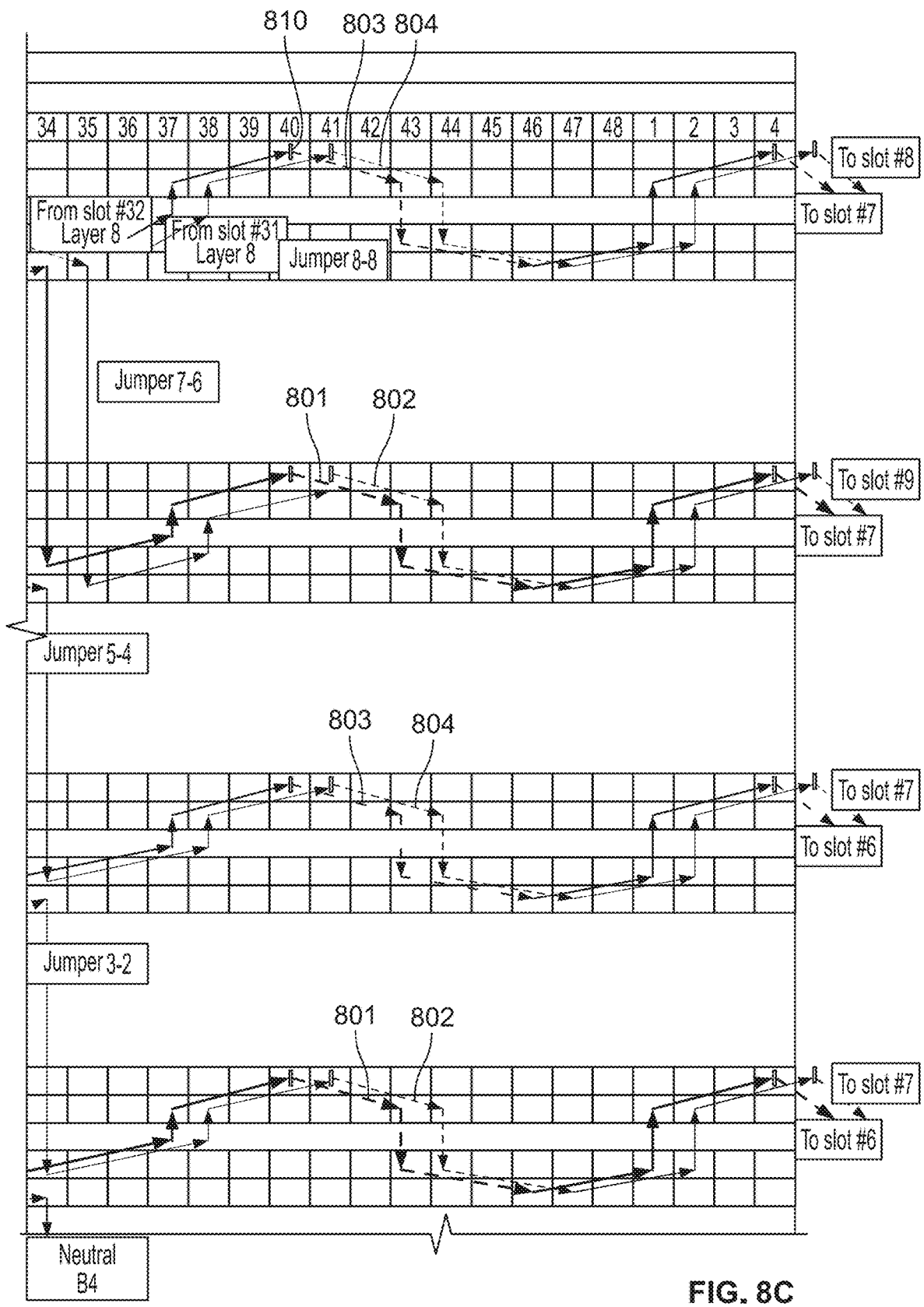
Figure 8D:
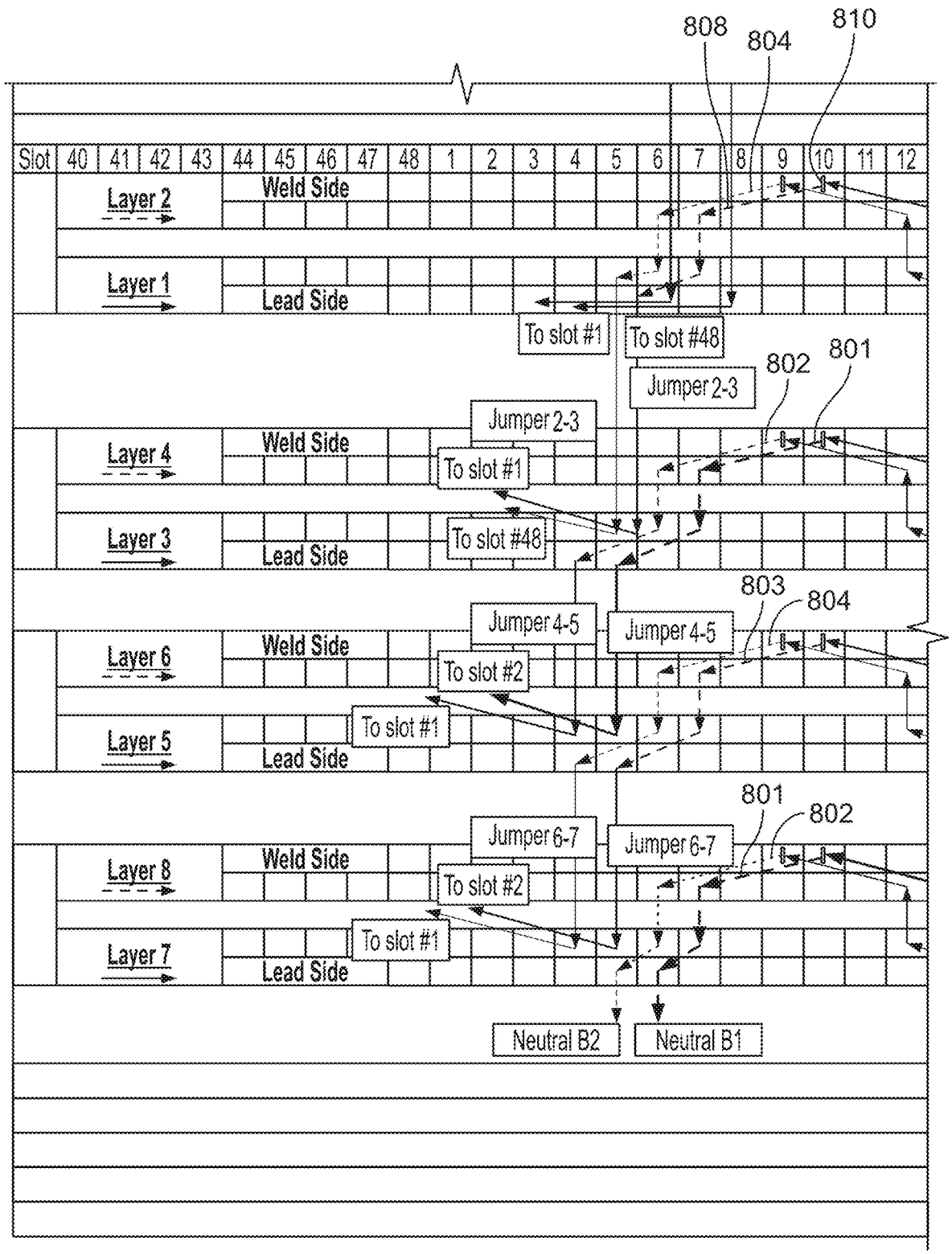
Figure 8E:
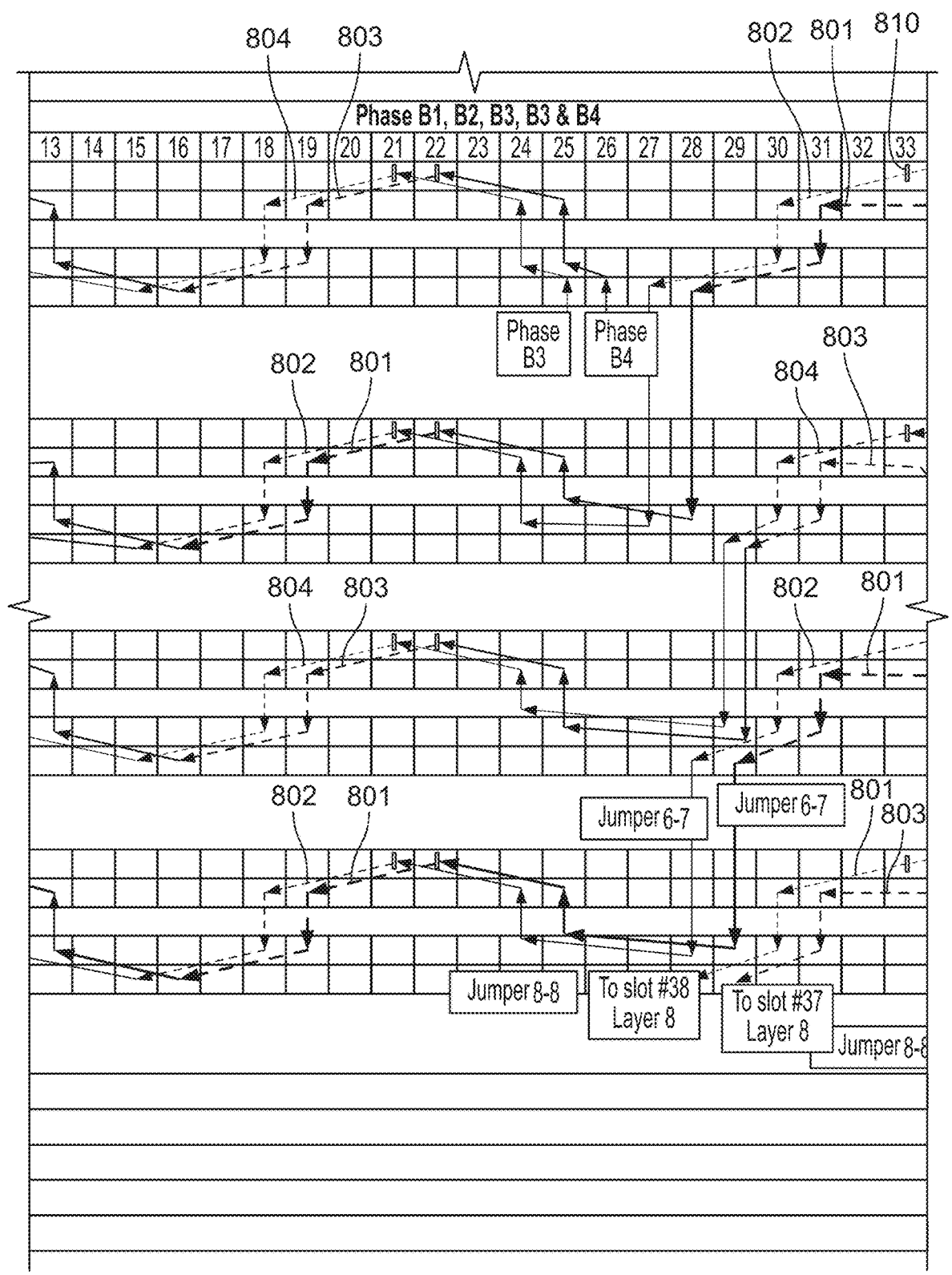
Figure 8F:
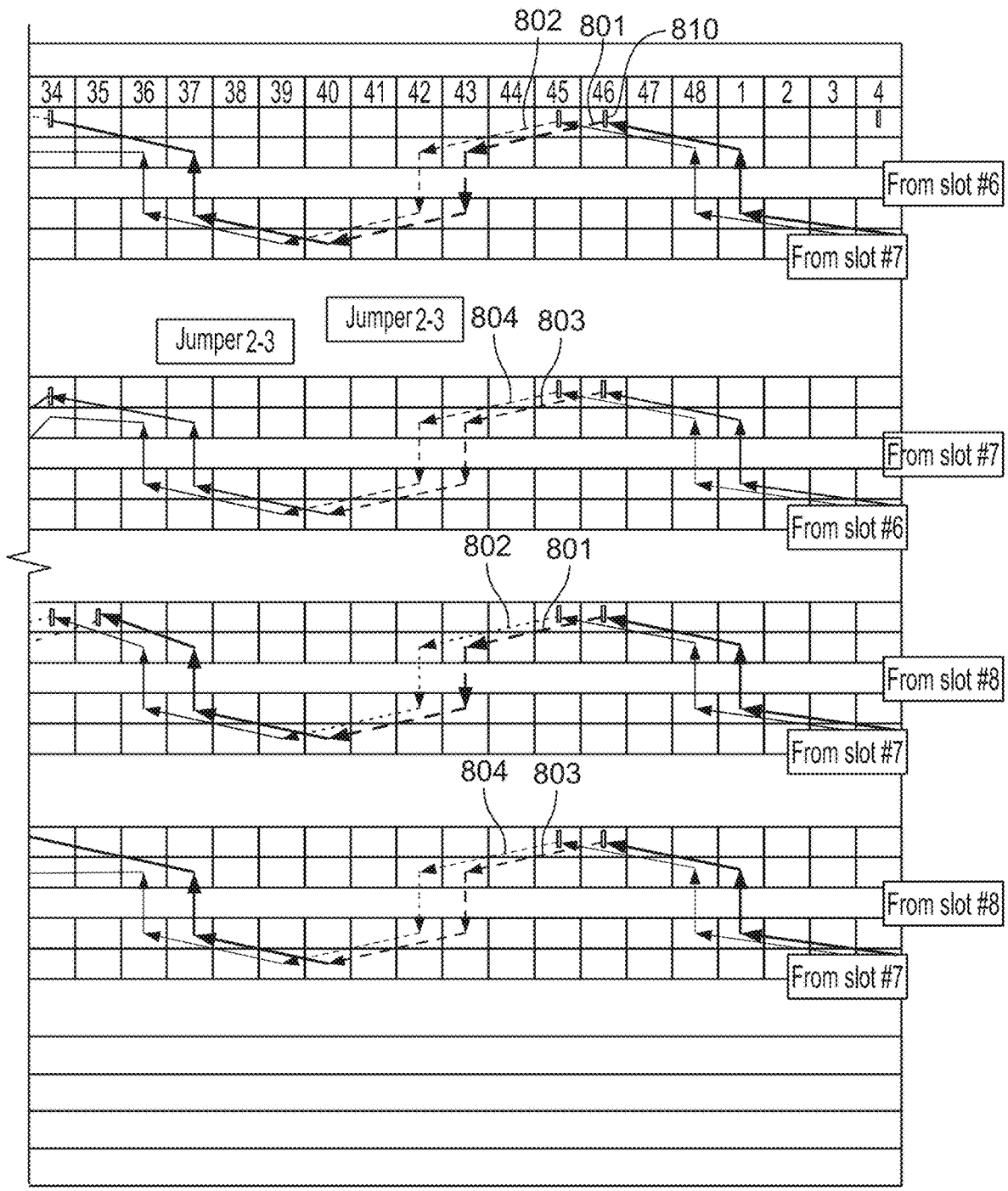
Figure 9A:
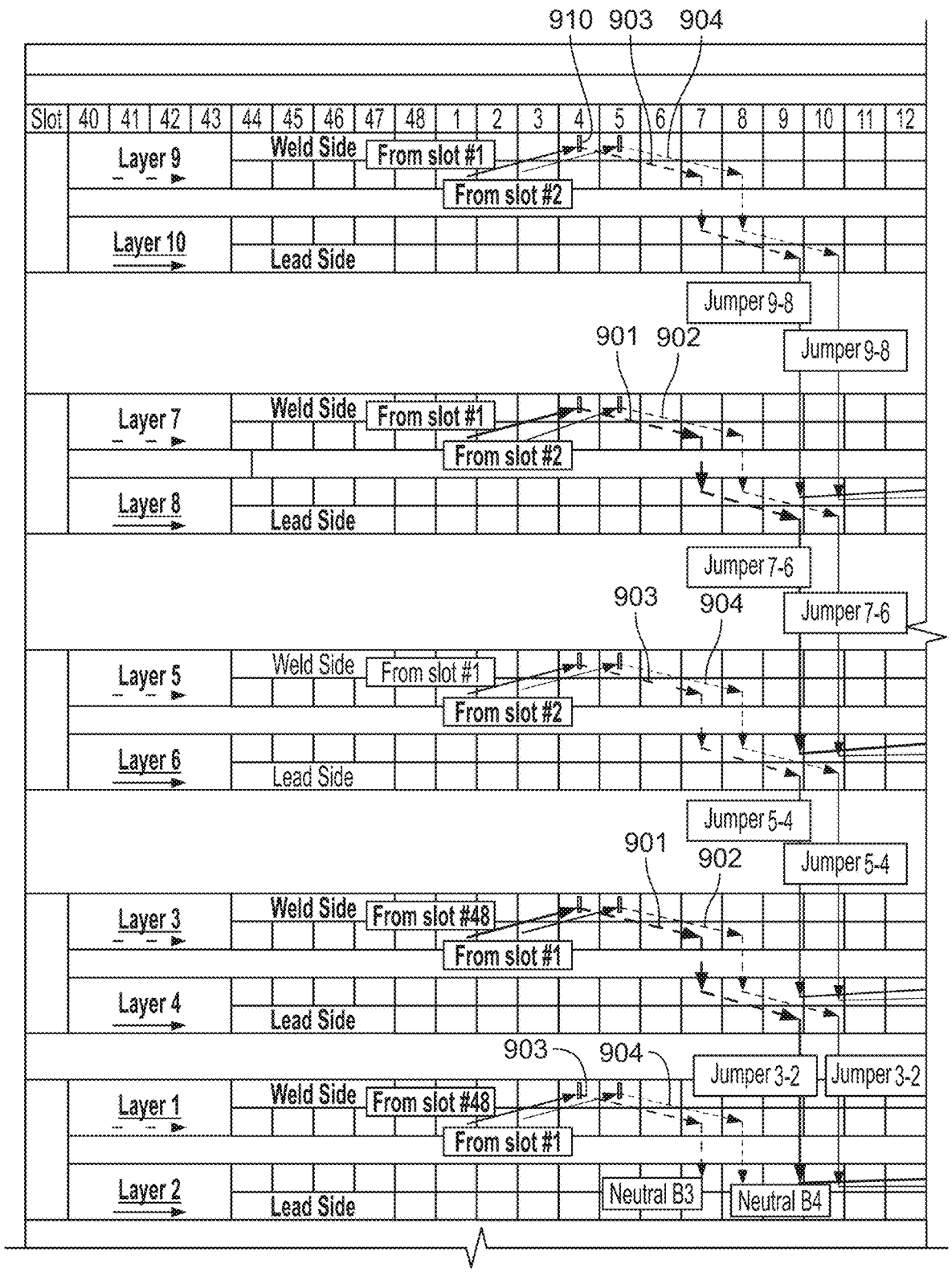
FIGS. 9A-9F shows an illustrative wiring schematic corresponding to parallel windings of one phase of a ten-layer stator, with a winding pitch of six slots, in accordance with some embodiments of the present disclosure.
Figure 9B:
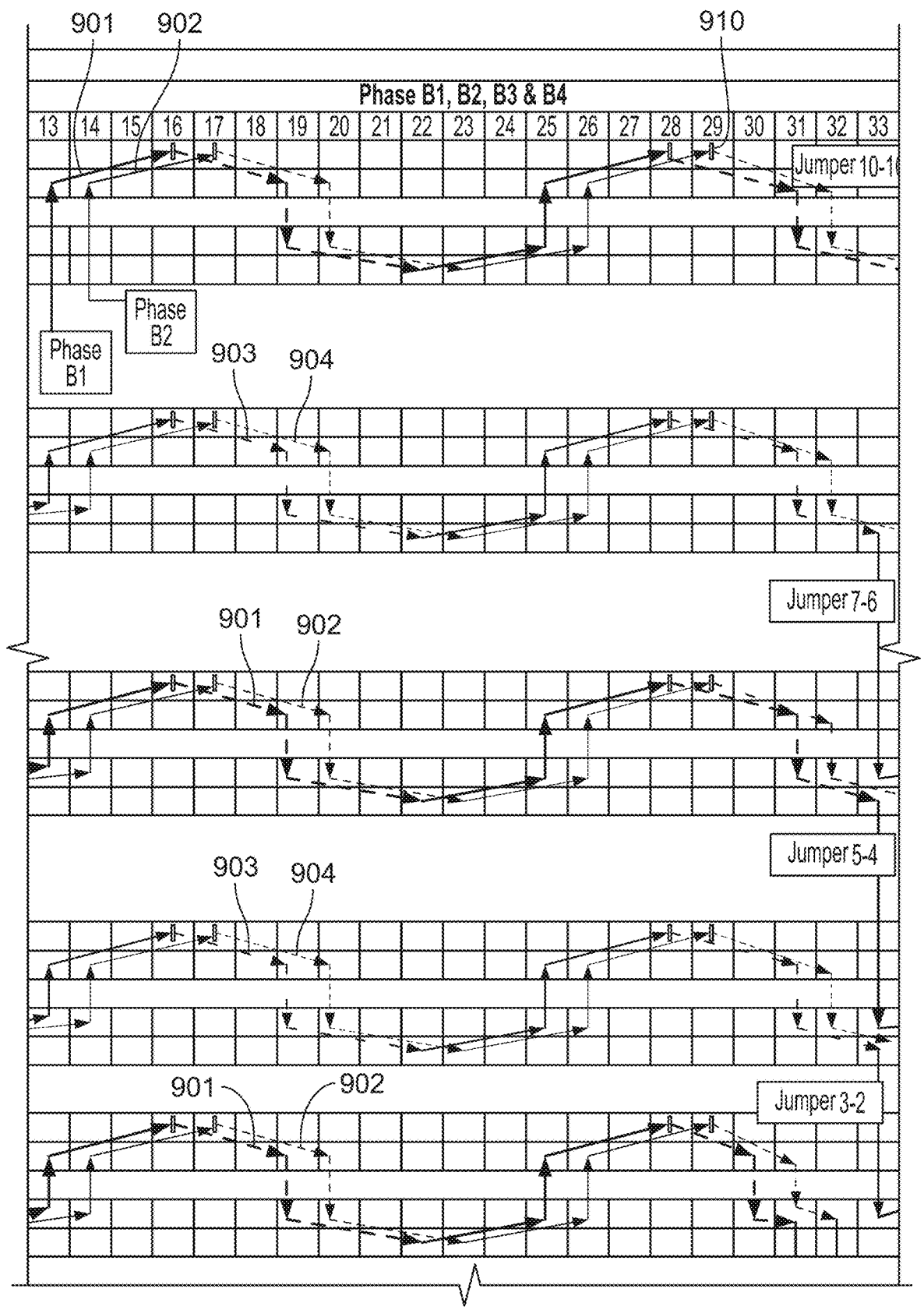
Figure 9C:
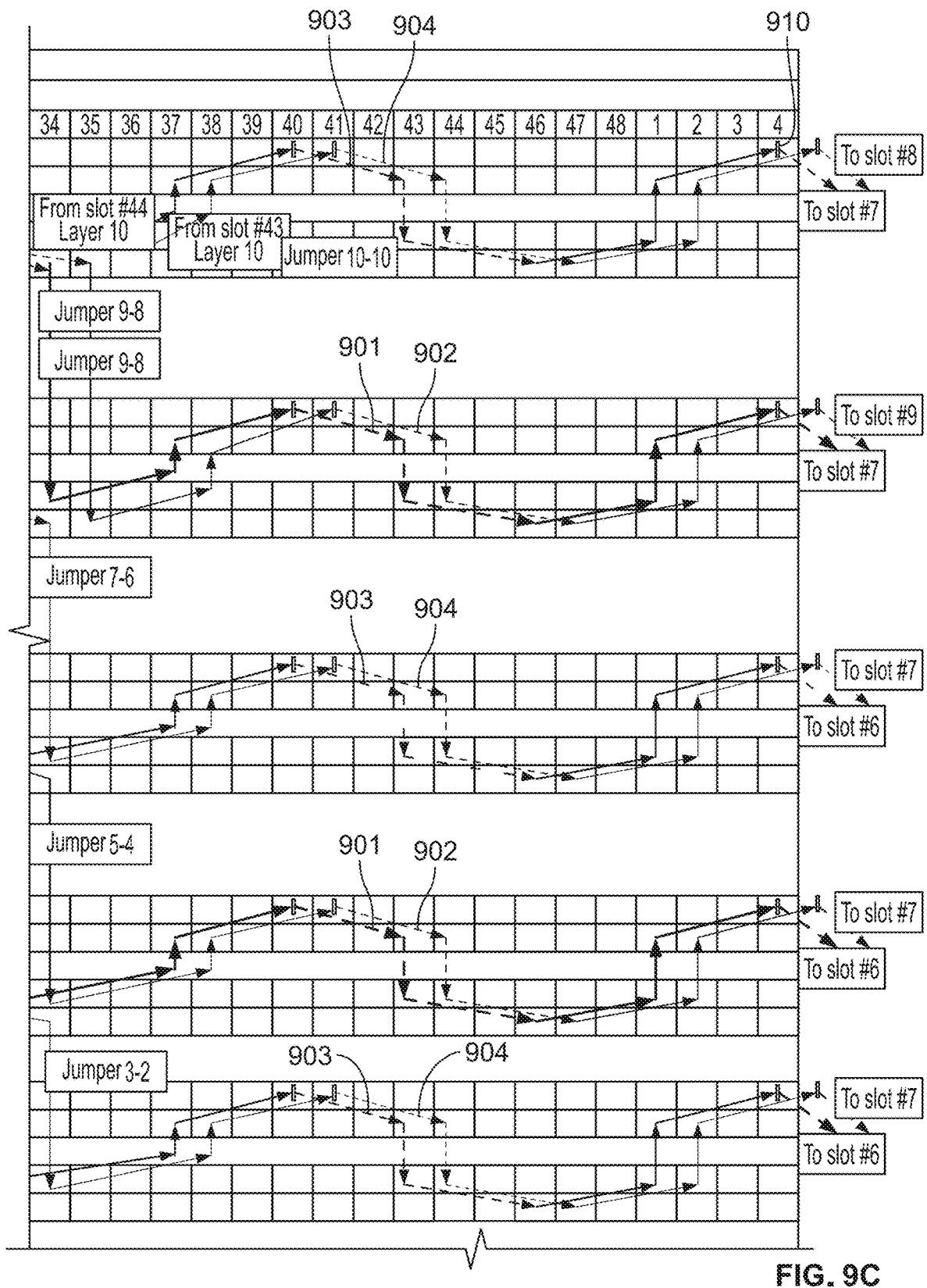
Figure 9D:
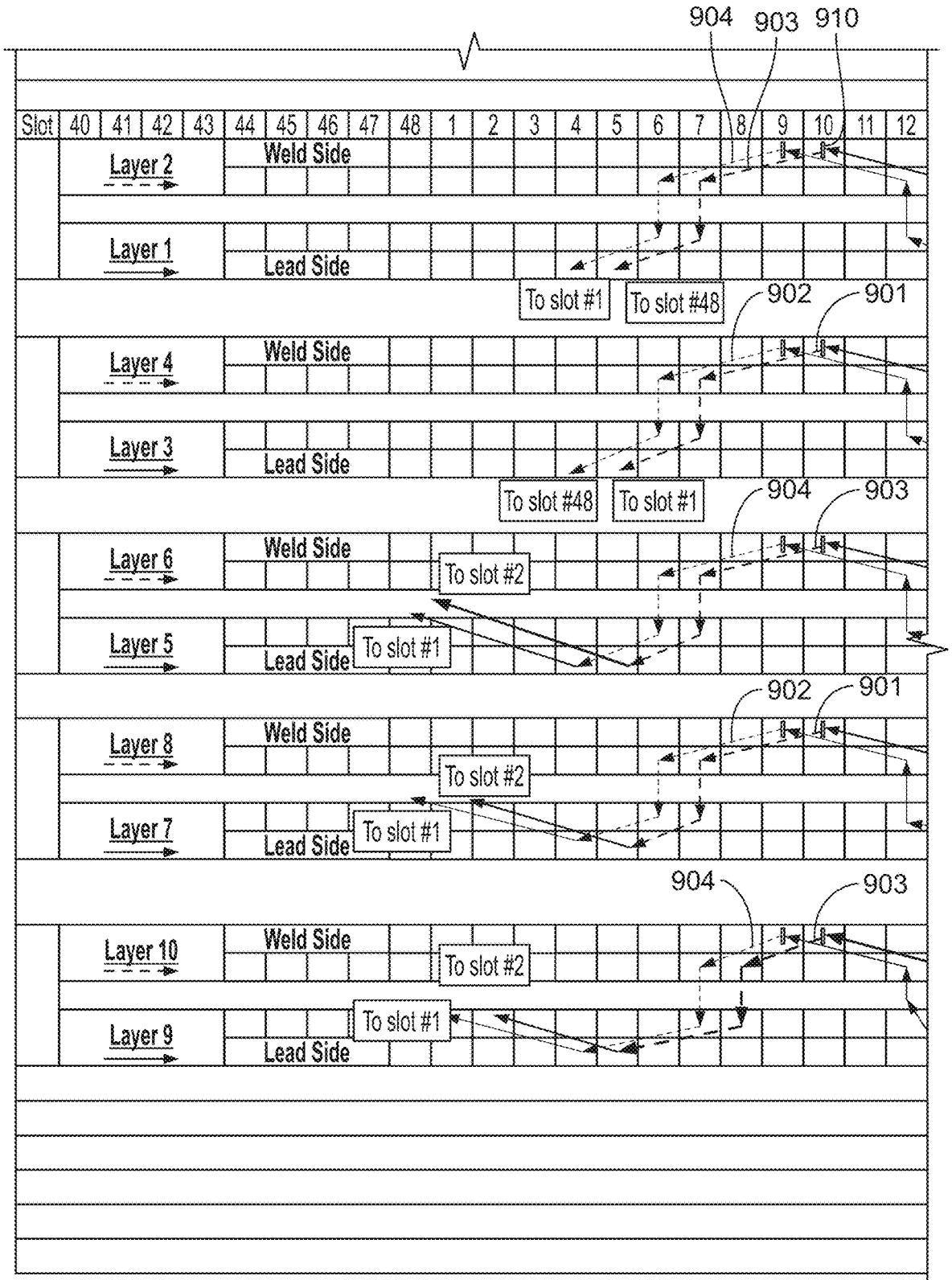
Figure 9E:
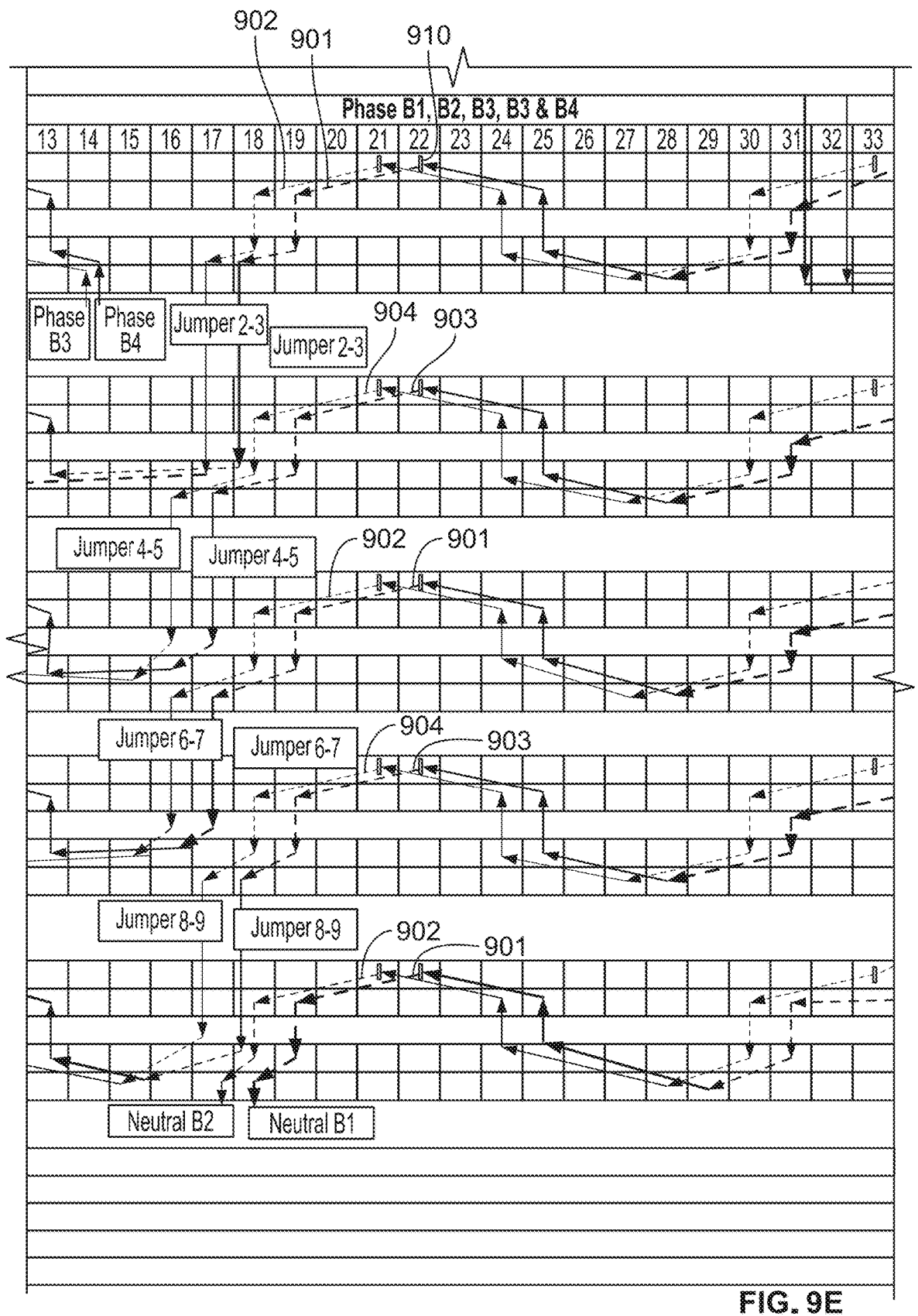
Figure 9F:
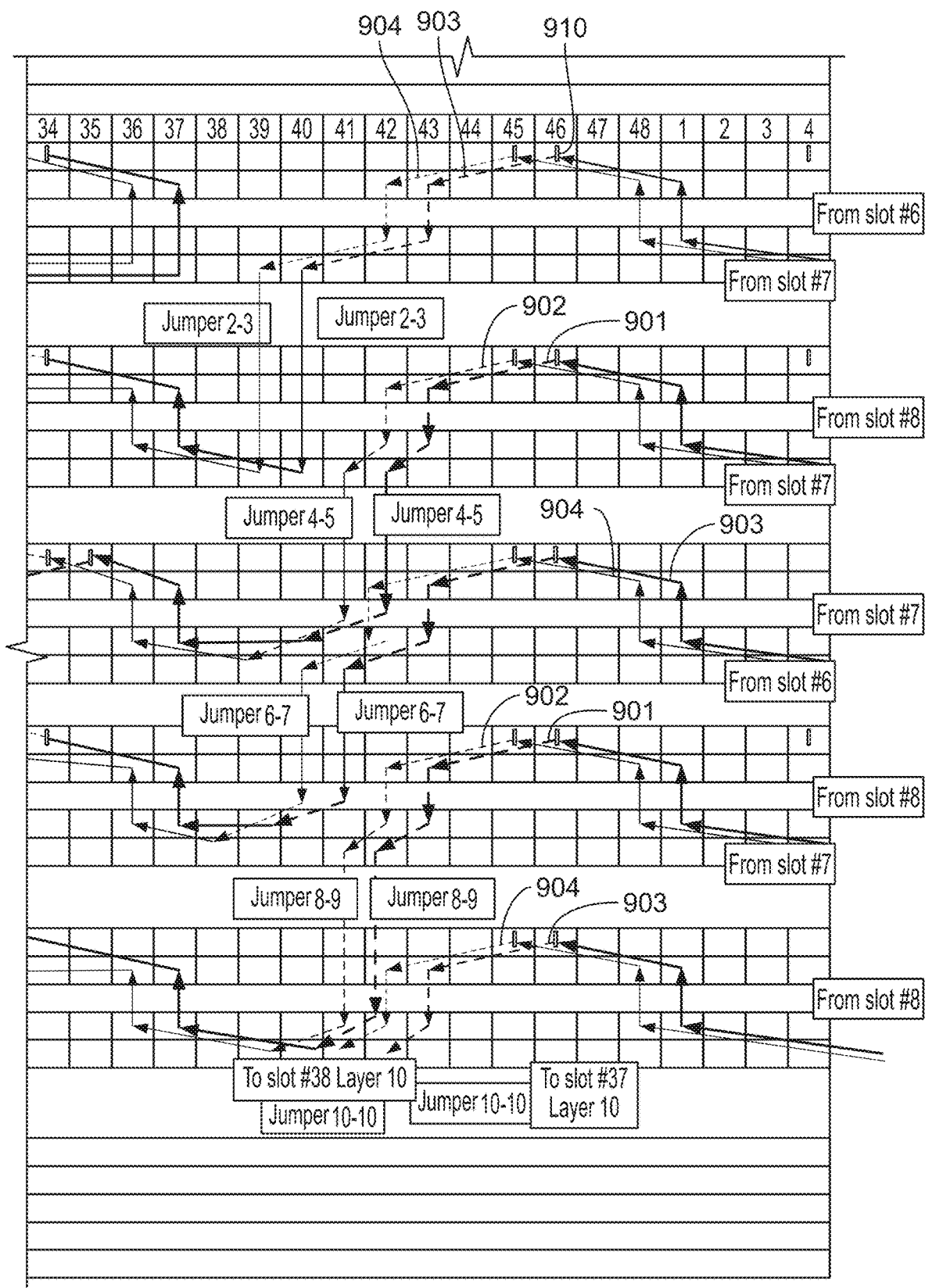
Figure 10A:
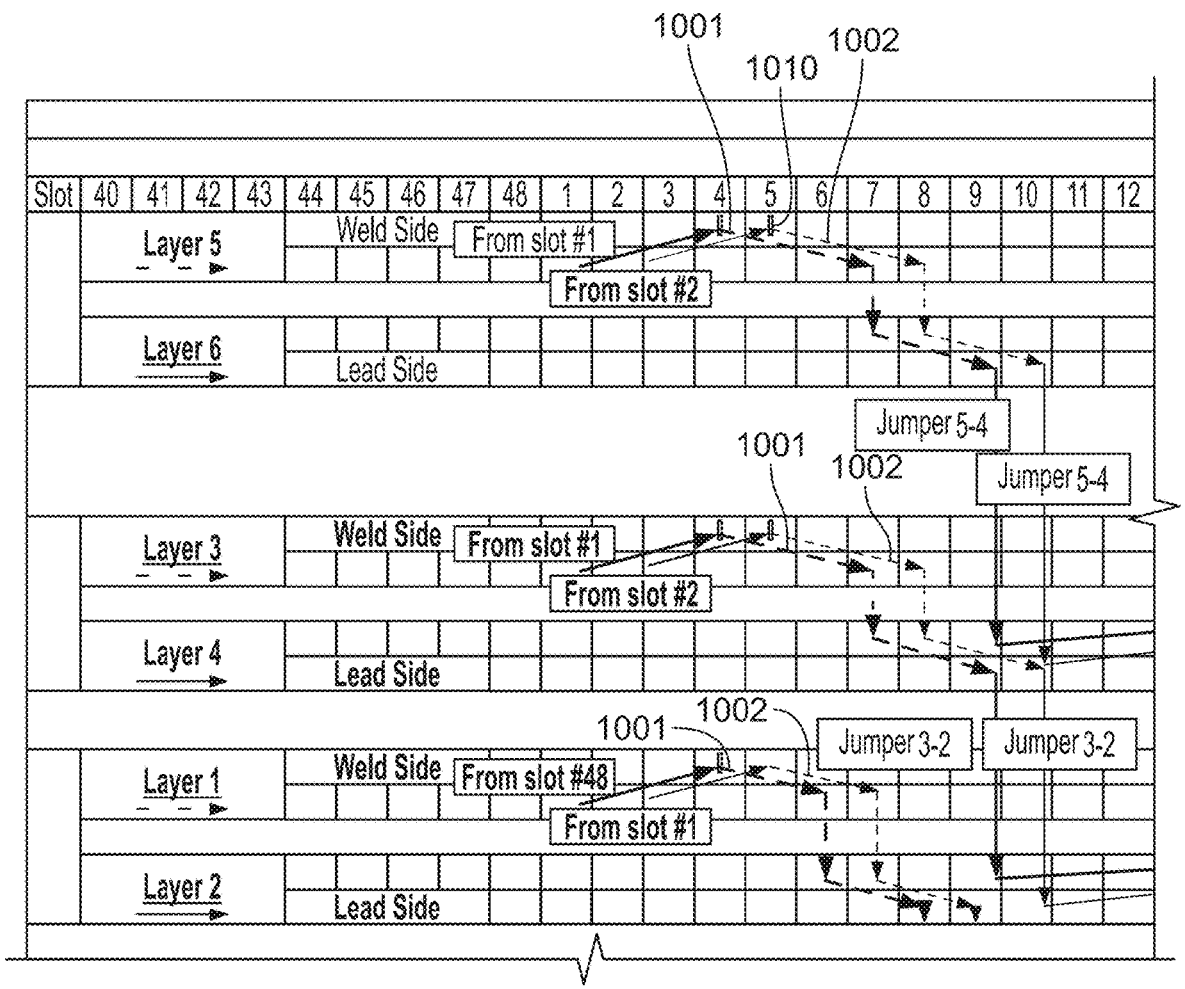
FIGS. 10A-10F shows an illustrative wiring schematic corresponding to parallel windings of one phase of a six-layer stator, with a winding pitch of six slots, in accordance with some embodiments of the present disclosure.
Figure 10B:
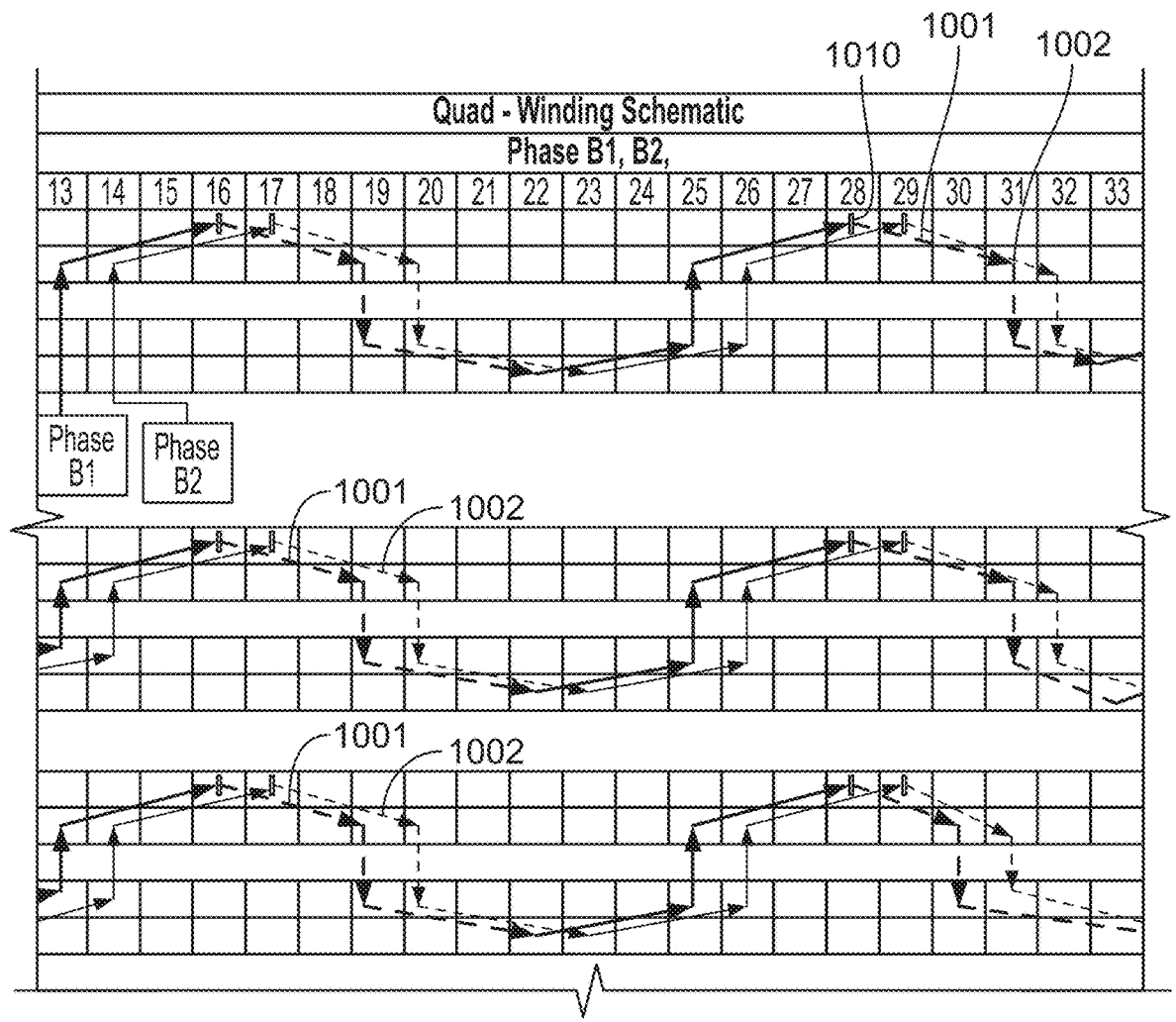
Figure 10C:
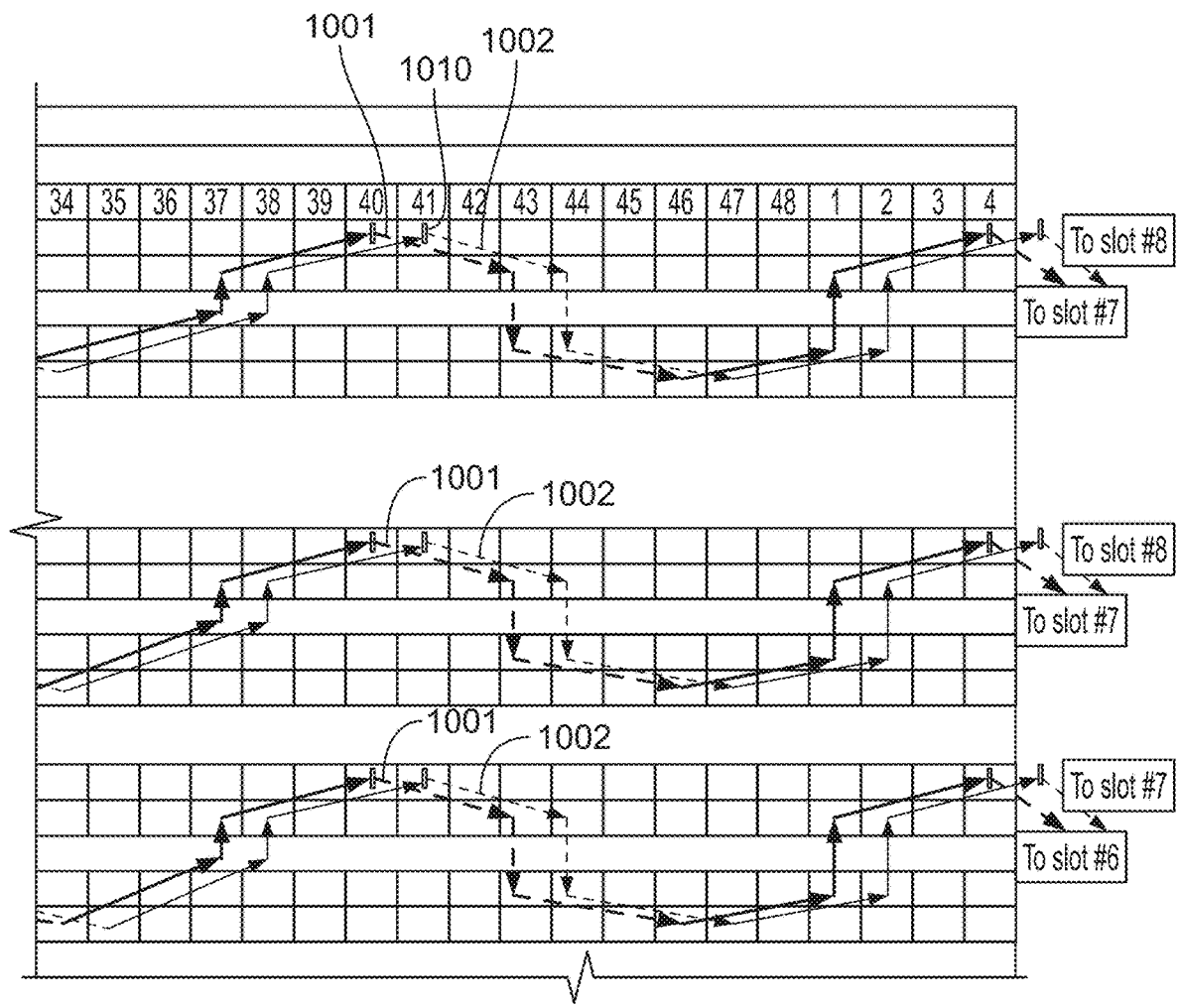
Figure 10D:
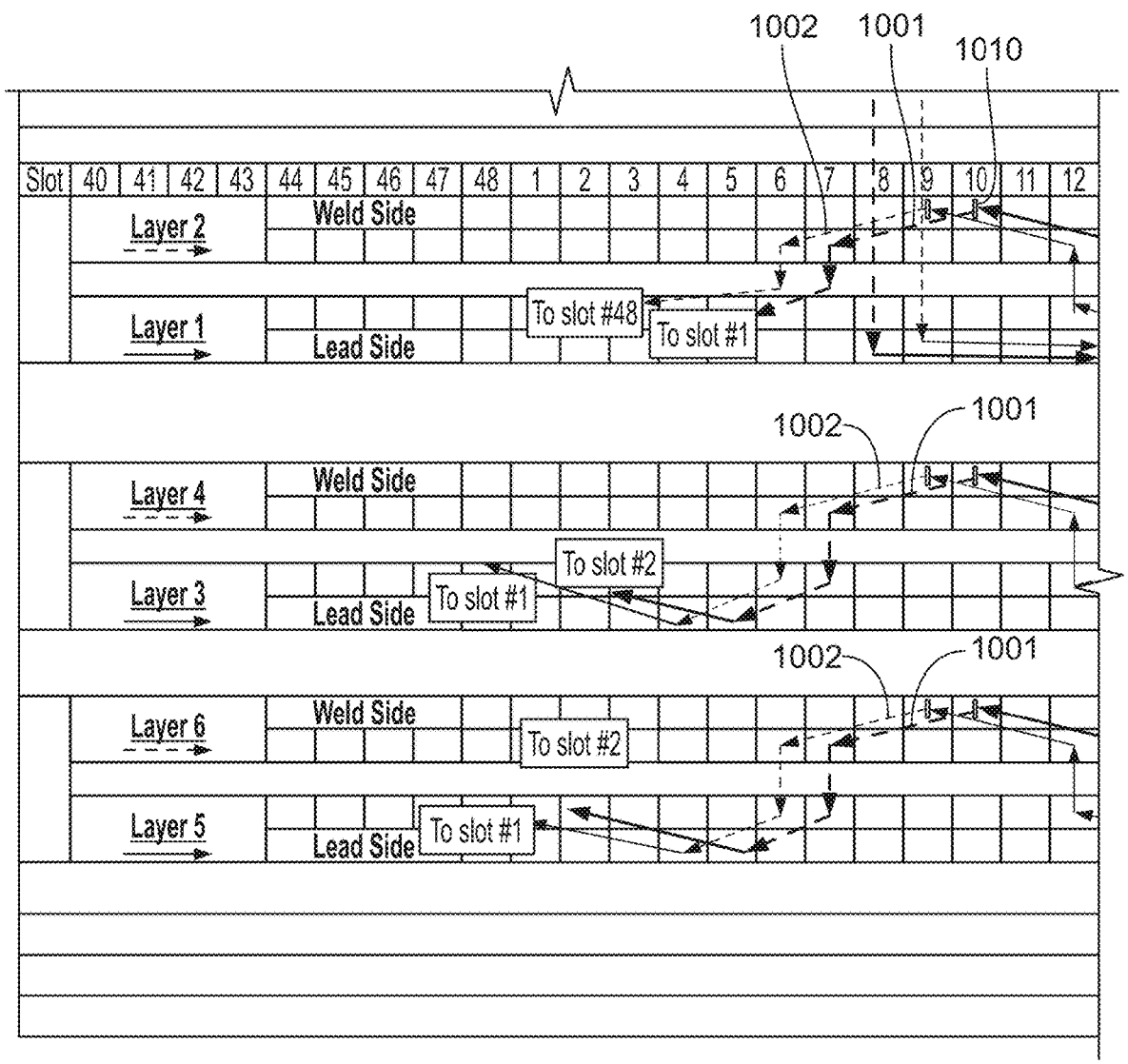
Figure 10E:
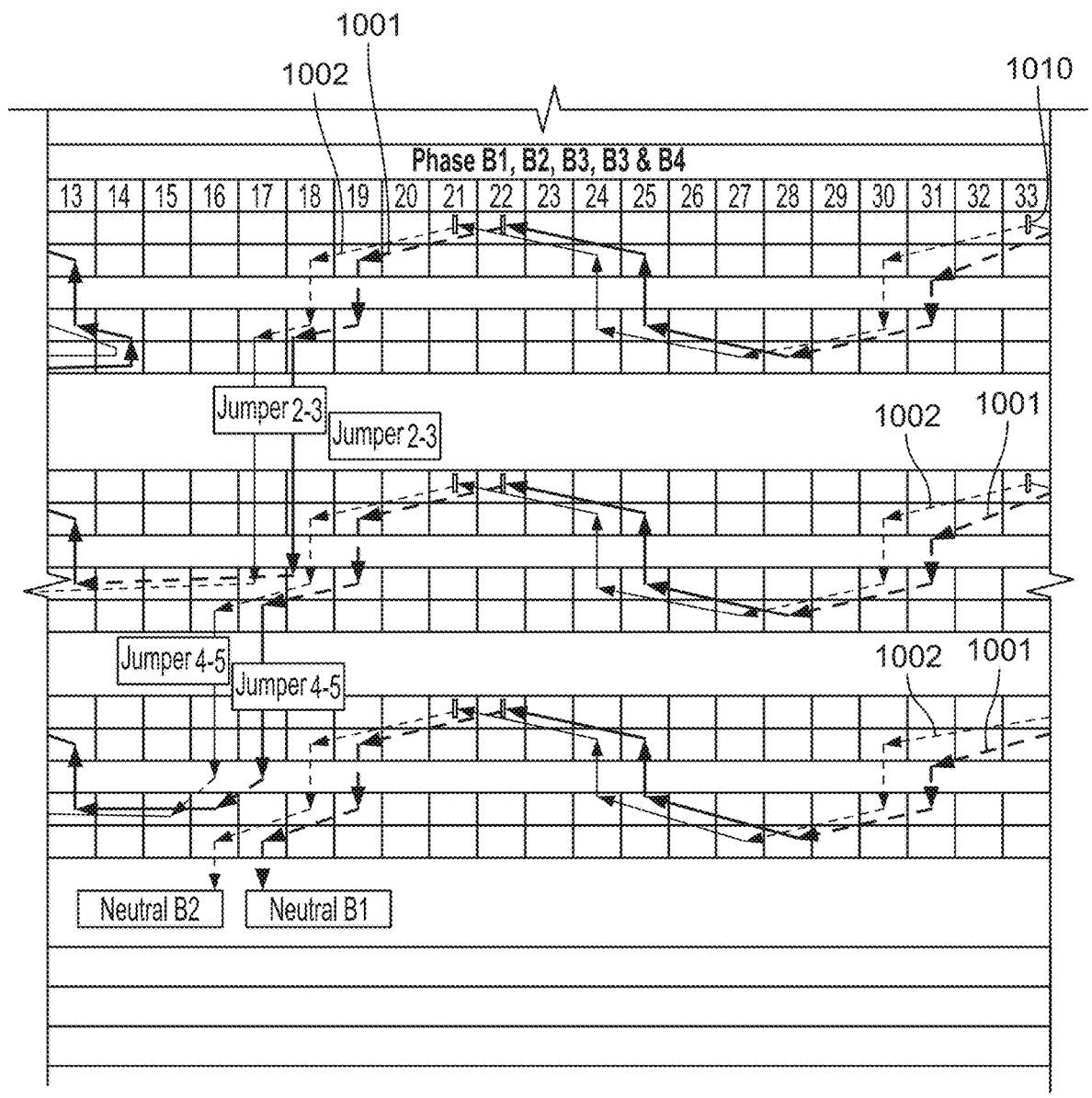
Figure 10F:
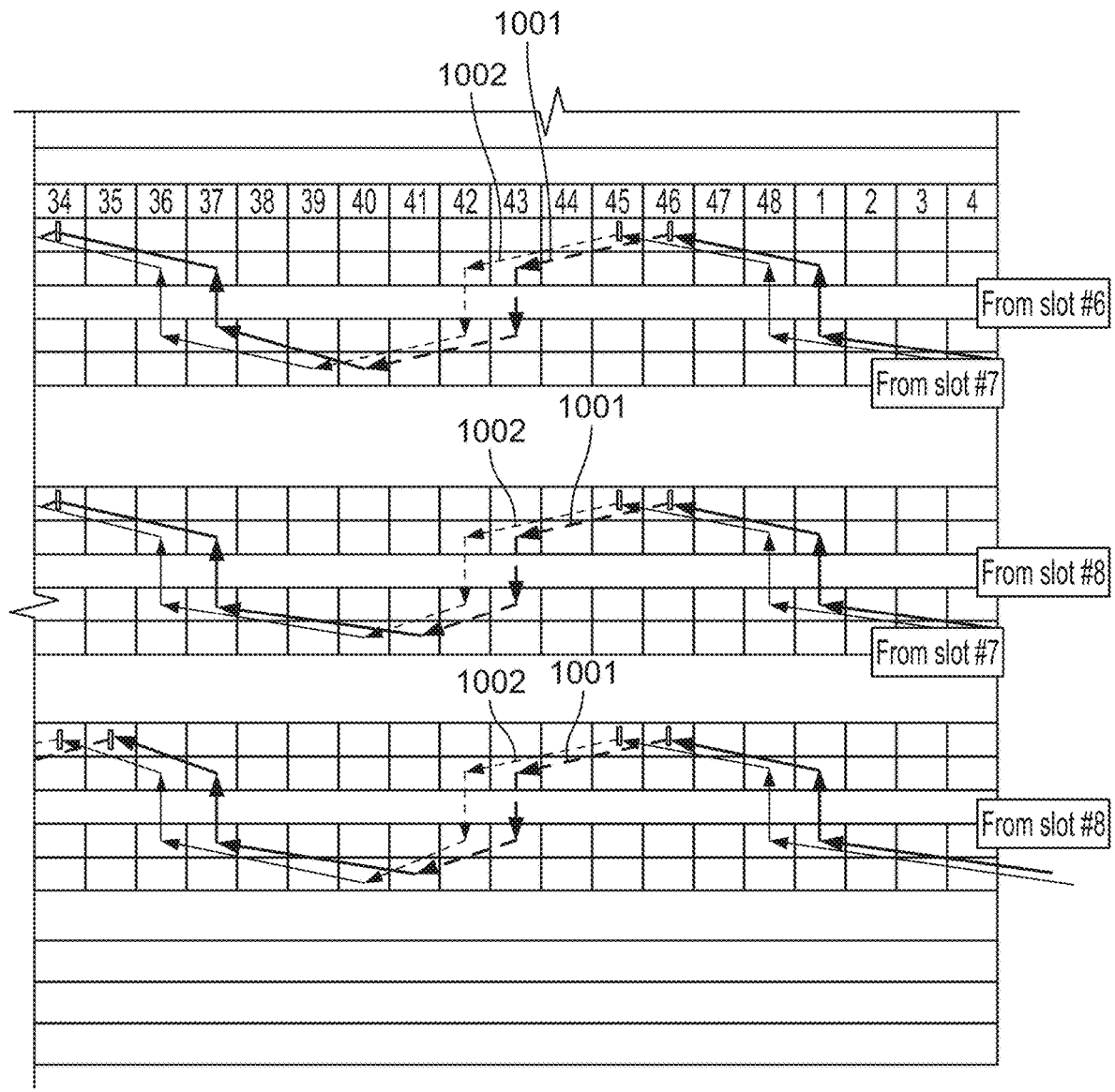
Figure 11A:
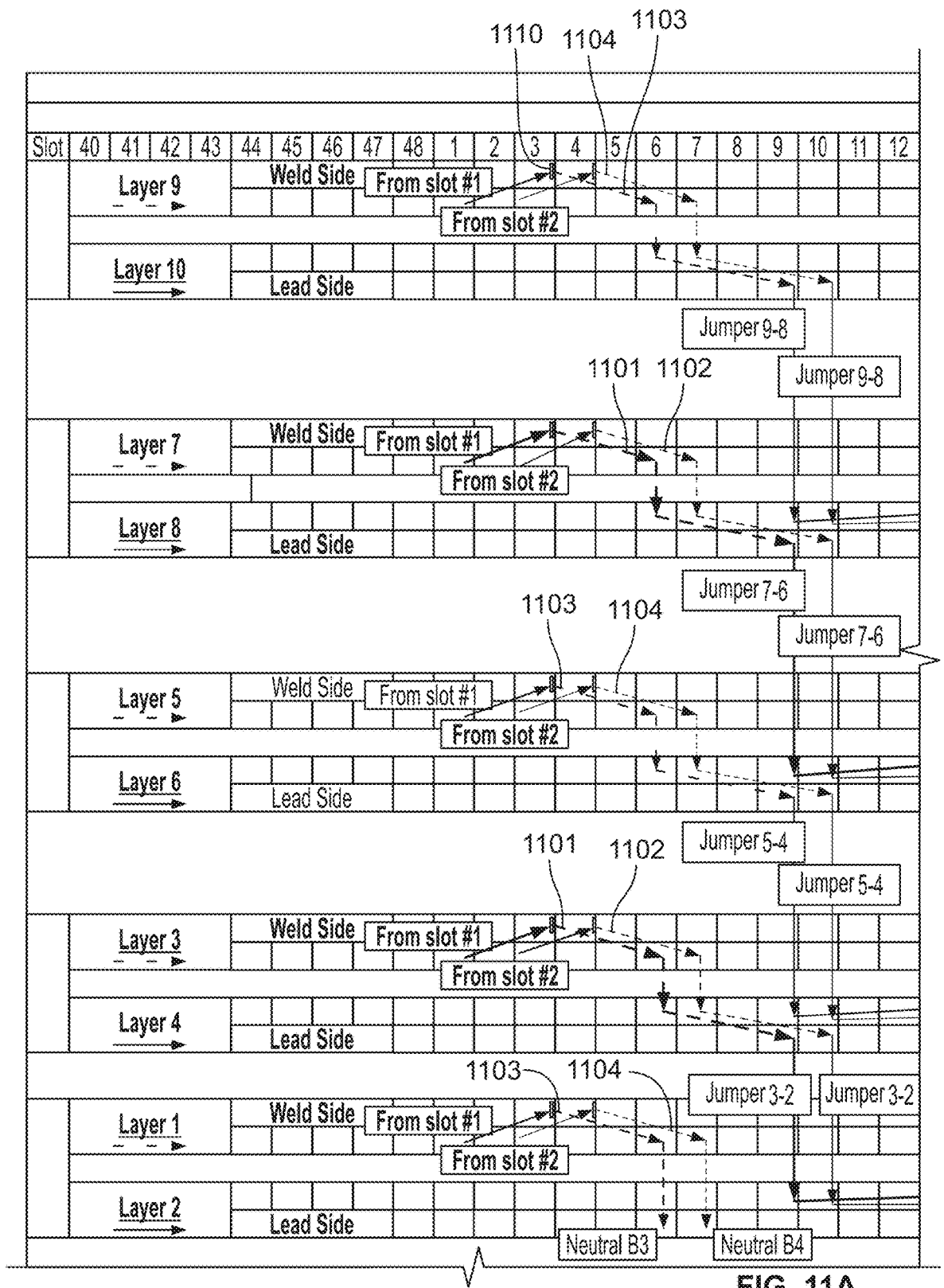
FIGS. 11A-11F shows an illustrative wiring schematic corresponding to parallel windings of one phase of a ten-layer stator, with a winding pitch of seven slots, in accordance with some embodiments of the present disclosure.
Figure 11B:
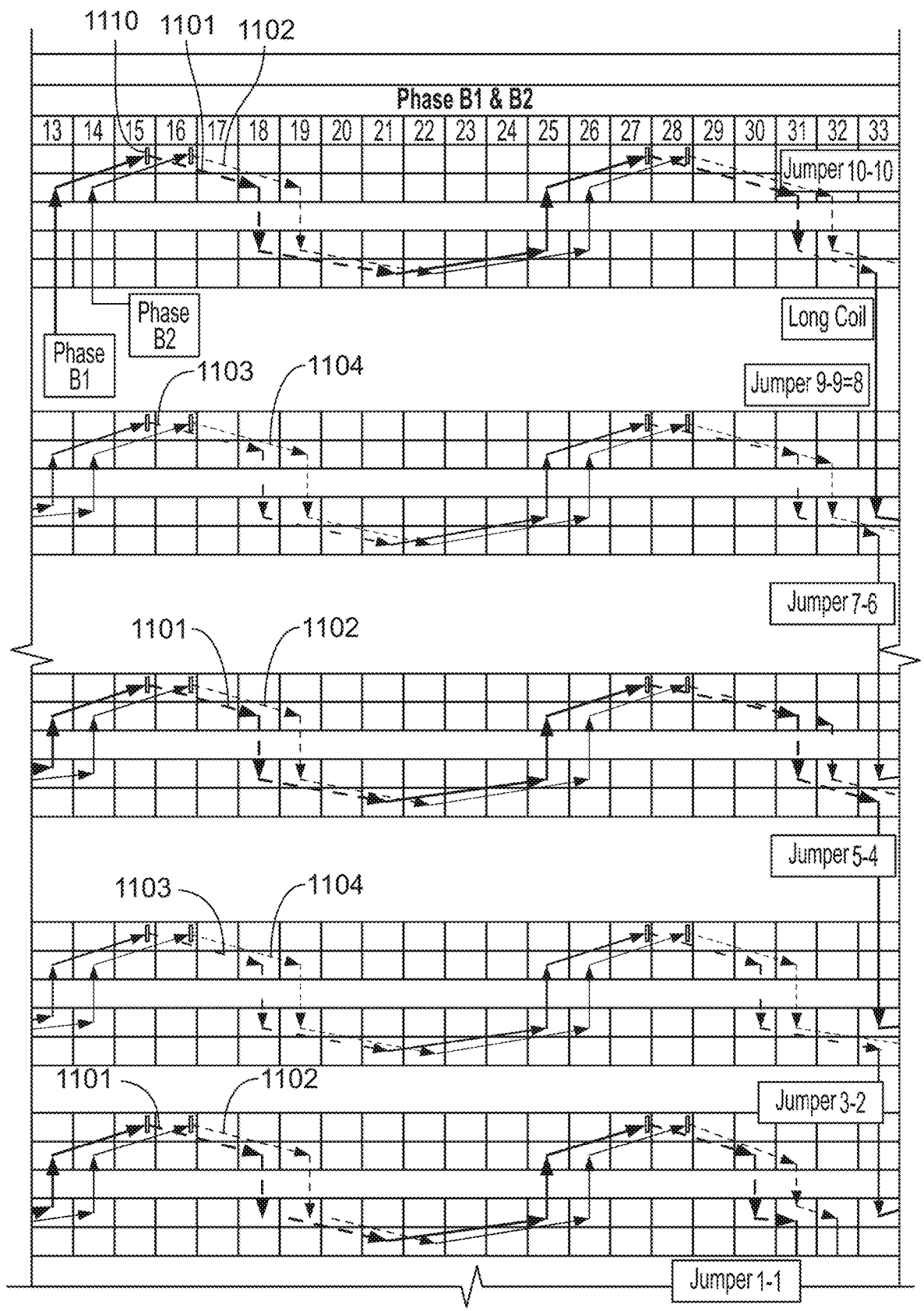
Figure 11C:
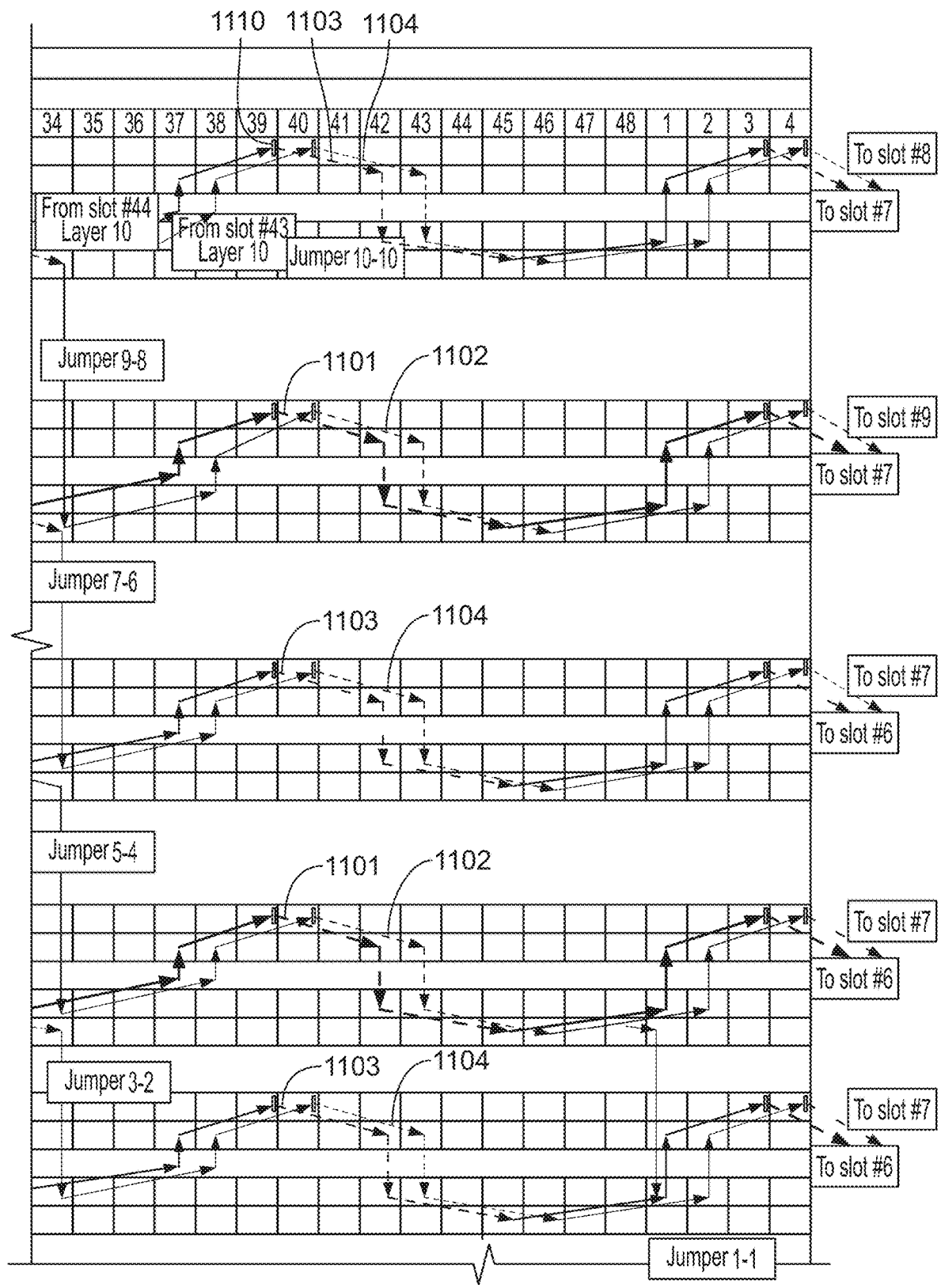
Figure 11D:
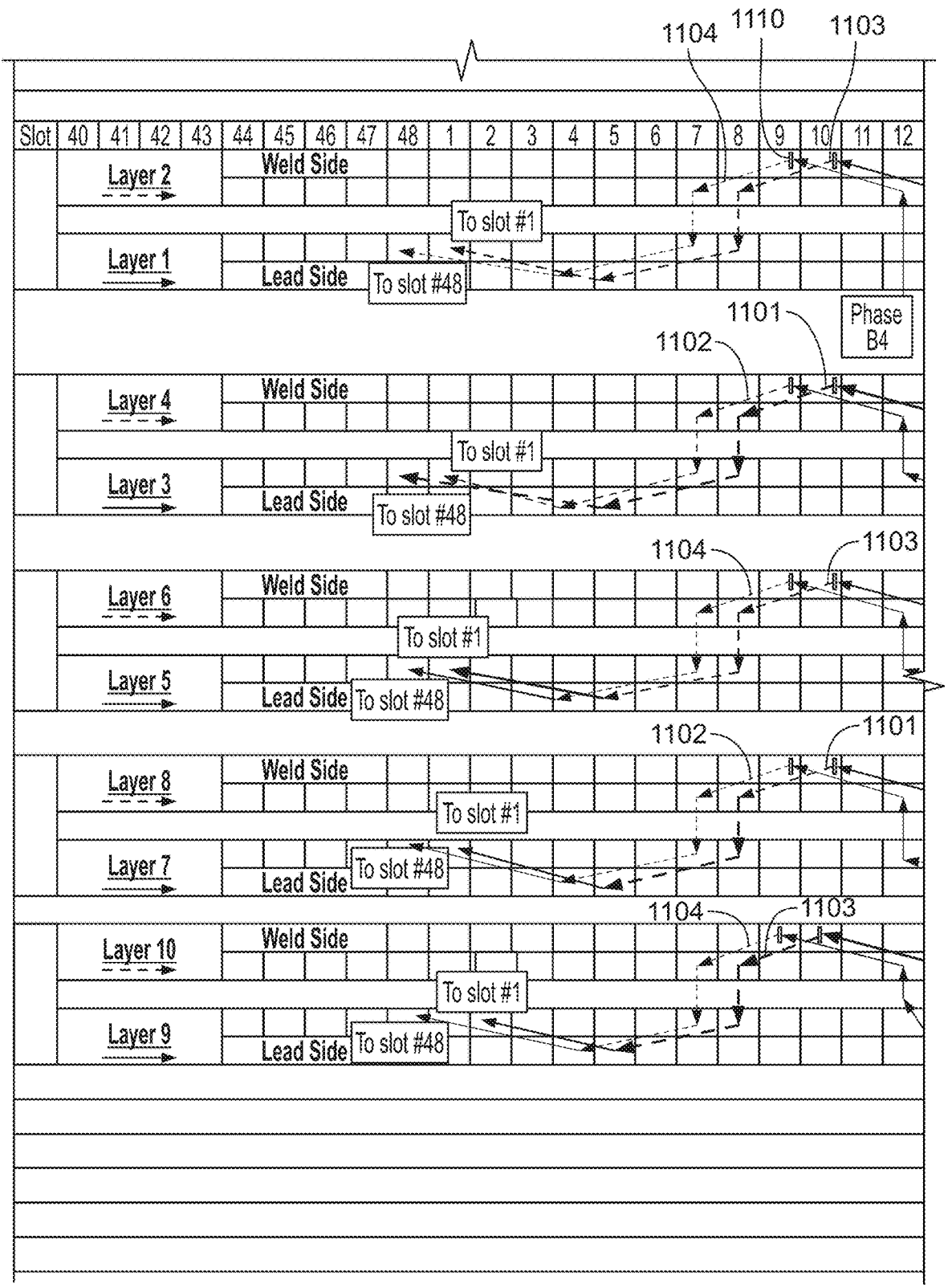
Figure 11E:
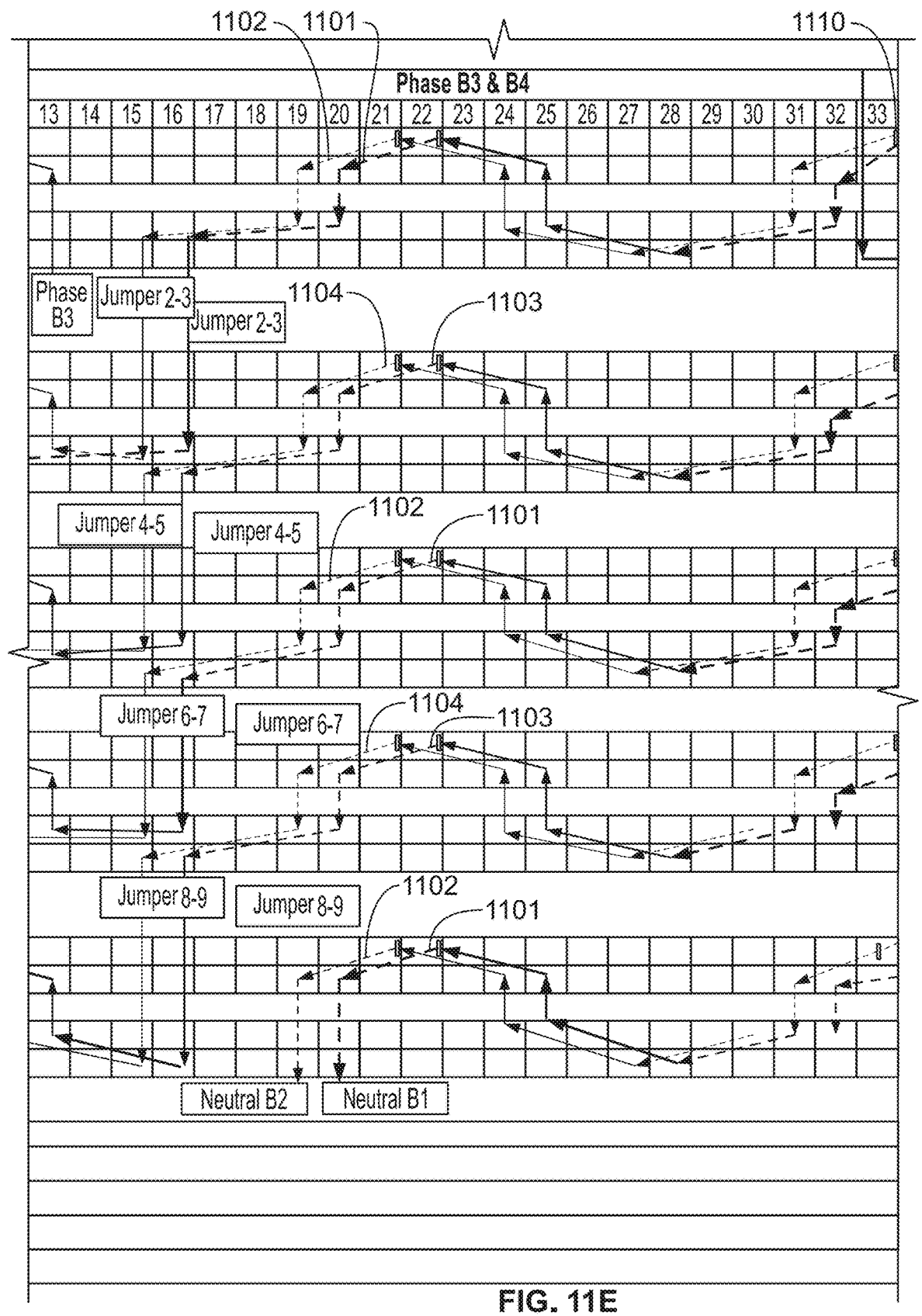
Figure 11F:
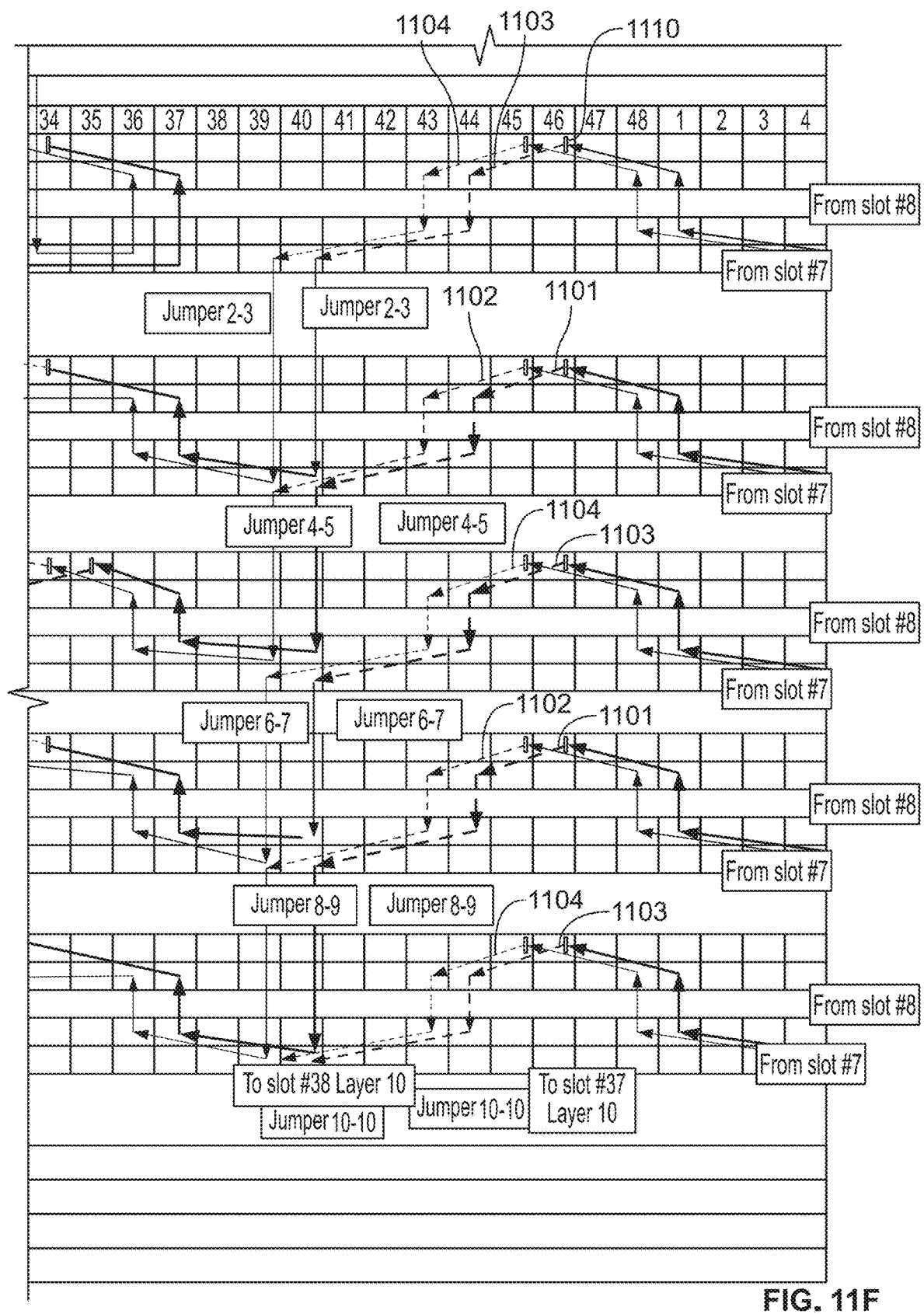
Figure 12A:
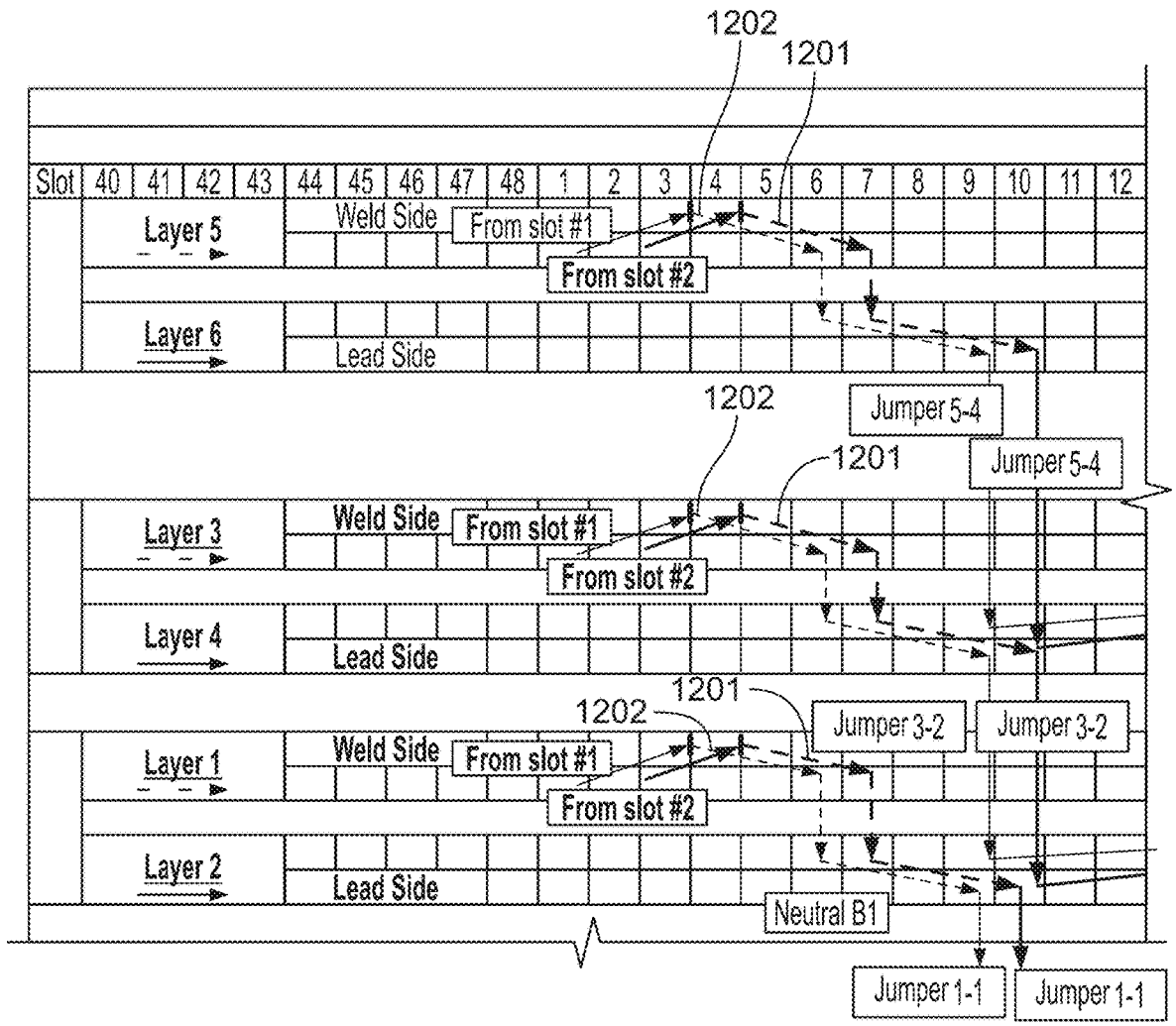
FIGS. 12A-12F shows an illustrative wiring schematic corresponding to parallel windings of one phase of a six-layer stator, with a winding pitch of seven slots, in accordance with some embodiments of the present disclosure.
Figure 12B:
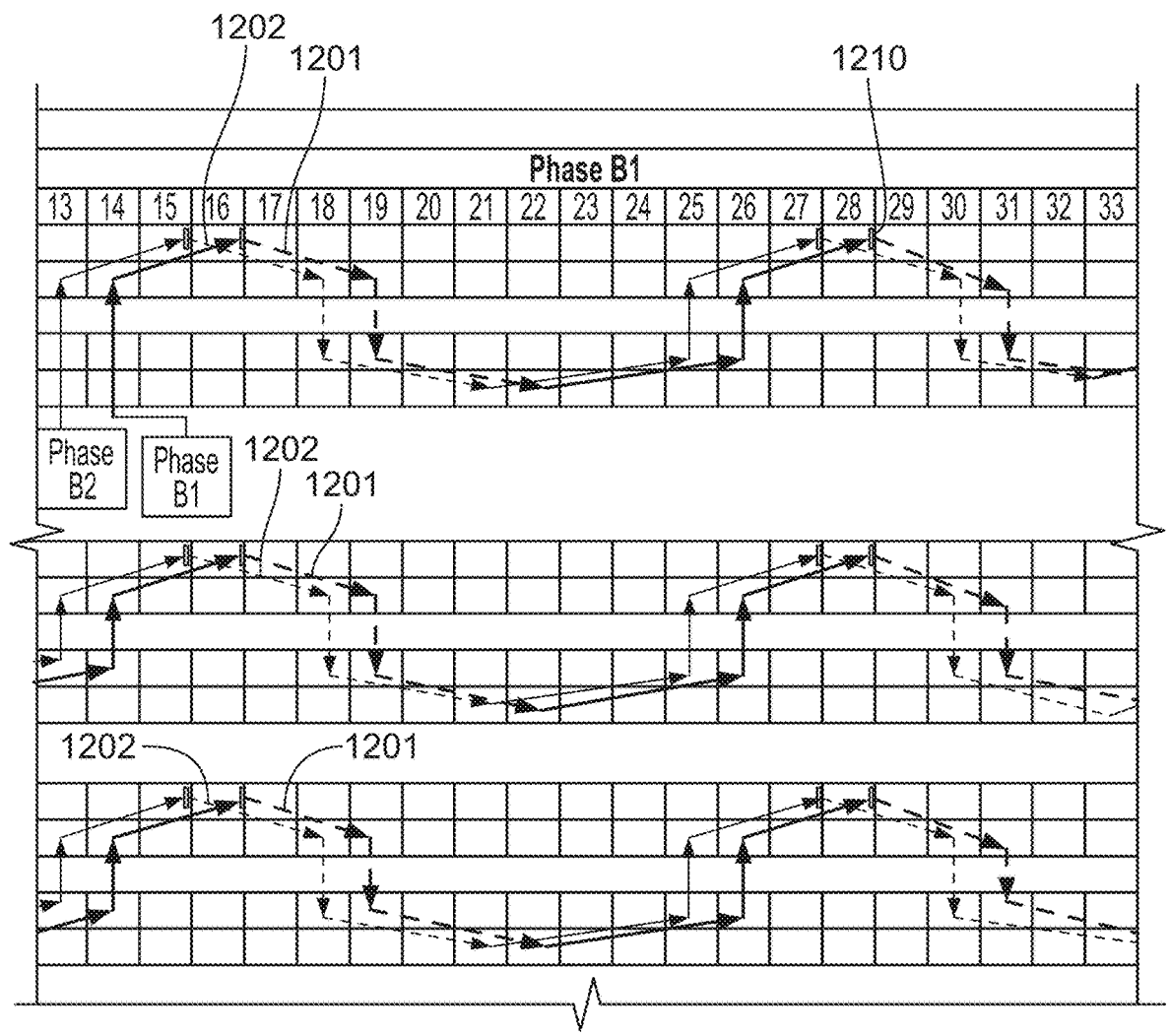
Figure 12C:
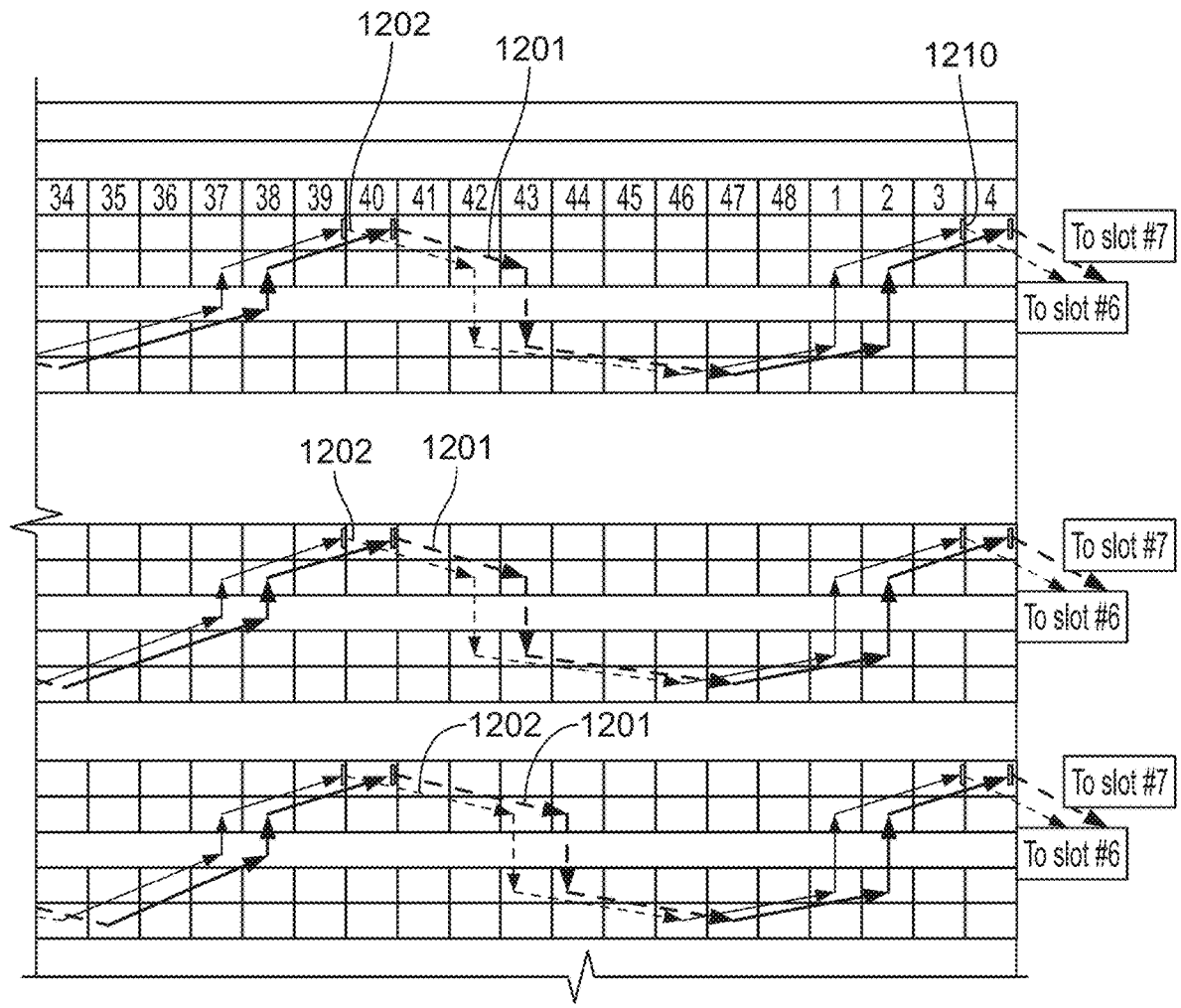
Figure 12D:
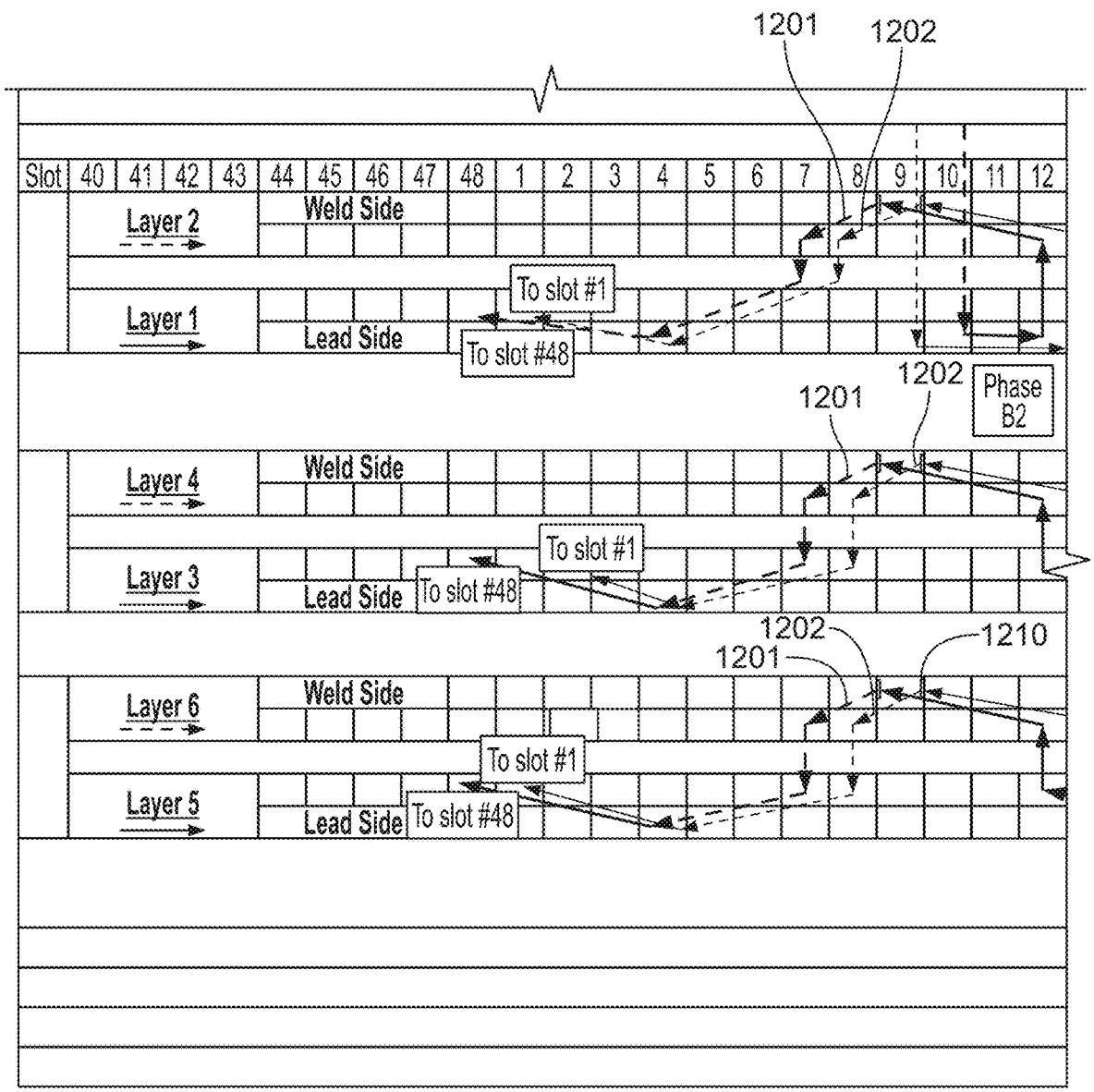
Figure 12E:
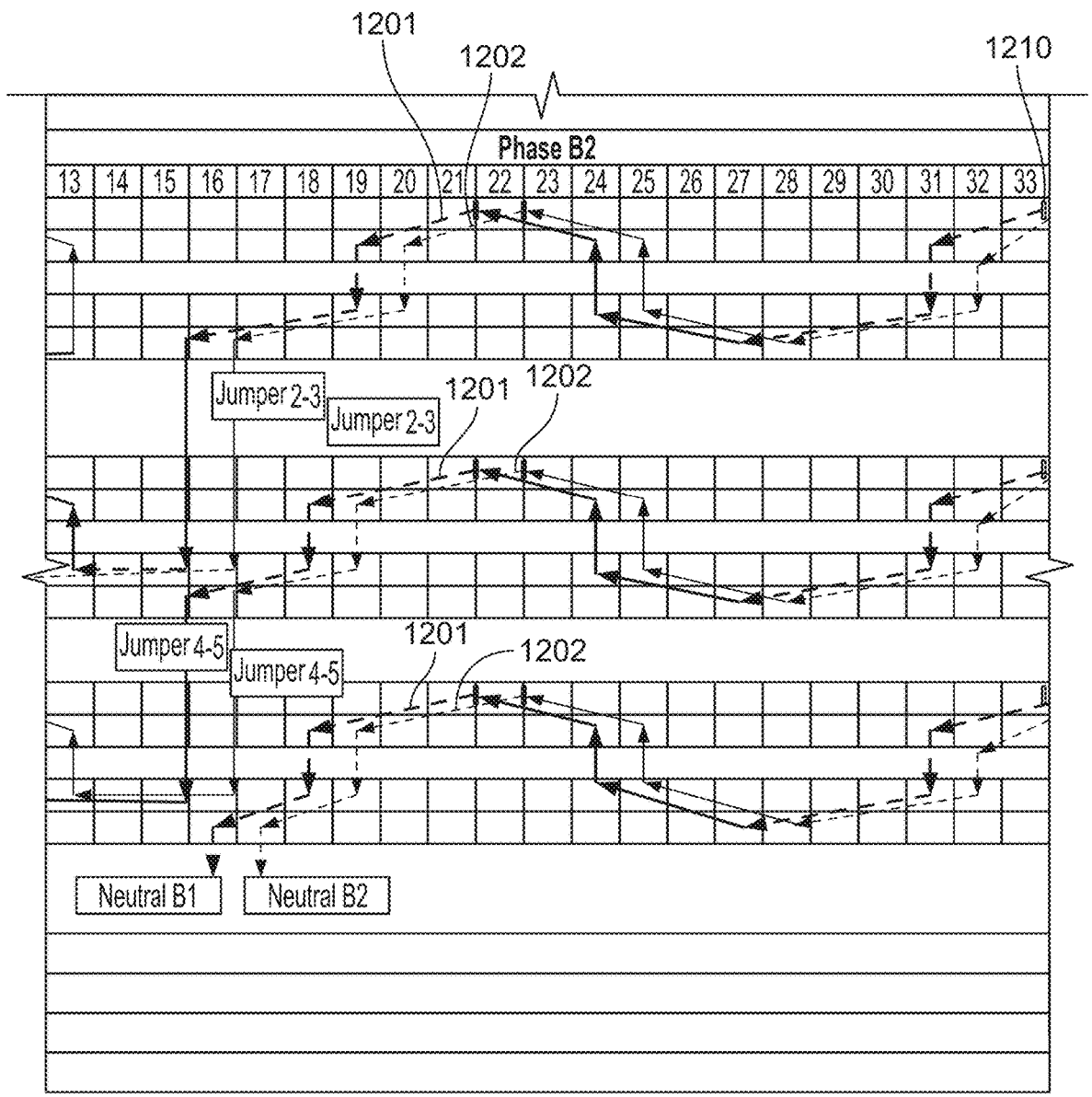
Figure 12F:
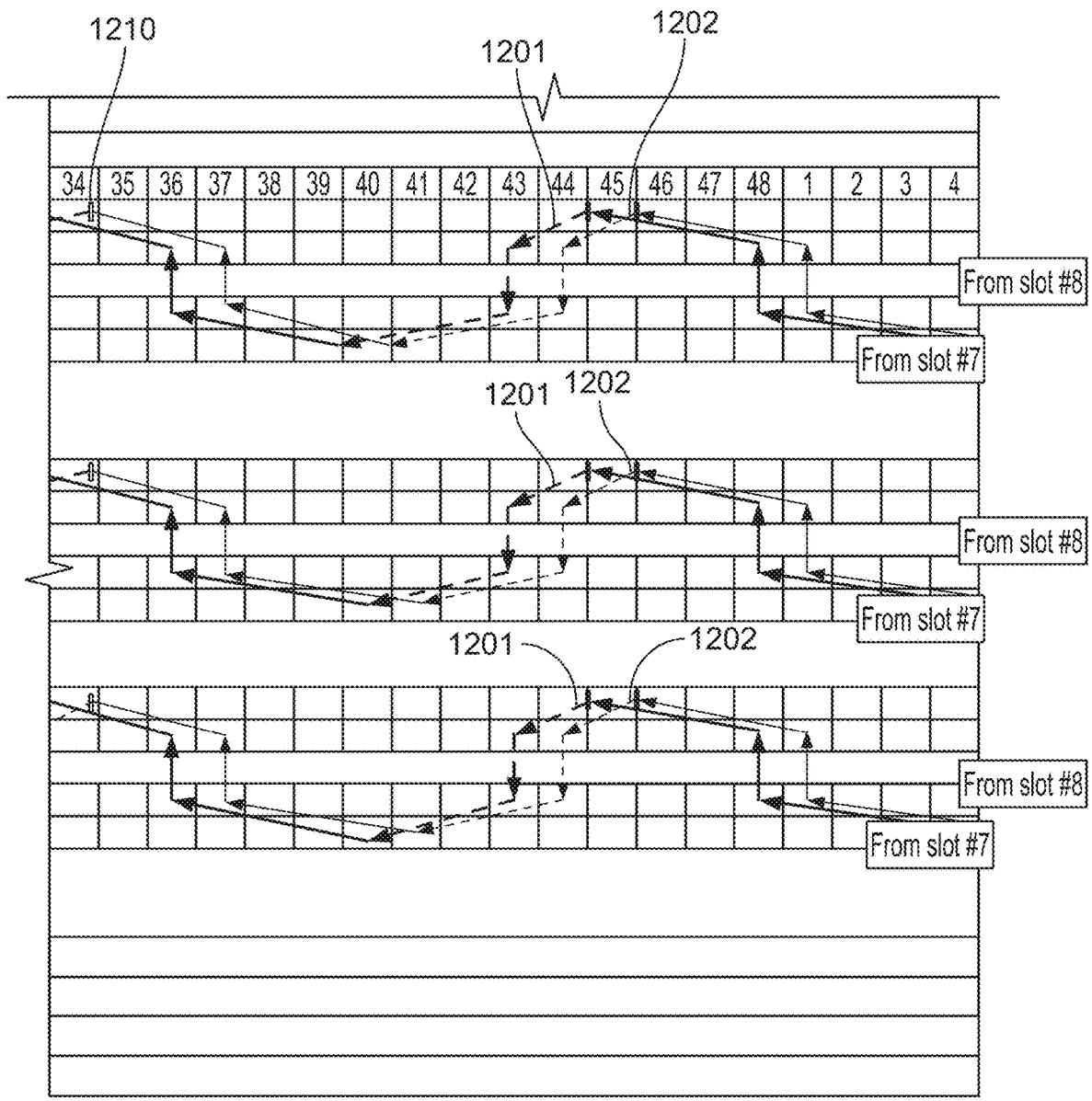

FIGS. 8A-8F show an illustrative wiring schematic corresponding to parallel windings of one phase (e.g., B phase) of an eight-layer stator, with a winding pitch of six slots, in accordance with some embodiments of the present disclosure. FIGS. 8A-8F are arranged in a 2×3 array to form a composite table, with FIGS. 8A-8C arranged in a 1×3 array, from left to right to form one table, and with FIGS. 8D-8F arranged underneath in a 1×3 array, from left to right to form another table. The winding schematic of FIGS. 8A-8F is arranged with slots indexed along the horizontal axis and layers indexed along the vertical axis. The paths of windings B1, B2, B3, and B4 are illustrated in FIGS. 8A-8F (e.g., as windings 801-804). As illustrated, hairpins can be inserted axially from the bottom of each layer (e.g., the crown side, or lead side 821), with the leg(s) of the hairpin extending vertically in the corresponding slot(s). As illustrated, welds 810 between legs of hairpins are illustrated on the top (e.g., weld side 820), represented by thick rectangular segments (an example weld point 810 is shown in FIG. 8A). In an illustrative example (not illustrated), phases A1 and A2 are the same as B1 and B2 shown in FIGS. 8A-8F, but are shifted 4 slots (e.g., A1 phase lead starts in slot 17 rather than slot 13 as with B1 phase lead), phases A3 and A4 are similarly the same as B3 and B4 but are shifted 4 slots (e.g., A3 phase lead starts in slot 28 rather than slot 24 as with B2 phase lead), phases C1 and C2 are the same as B1 and B2 but are shifted 8 slots (e.g., C1 phase lead starts in slot 21 rather than slot 13 as with B1 phase lead), and phases C3 and C4 are the same as B1 and B2 but are shifted 8 slots (e.g., C3 phase lead starts in slot 32 rather than slot 24 as with B2 phase lead). Based on the wiring path of FIGS. 8A-8F, Table 3 shows the number of unique hairpins (e.g., of each type and total number of different shapes).

TABLE 3

Unique hairpins corresponding to FIGS. 8A-8F

| Hairpin Type | Number | Notes |
|---|---|---|
| Regular | 4 | (four sizes for radial position differences) |
| Jumper | 3 | (layer 6-7 jump, layer 5-4 jump, layer 3-2 jump) |
| Jumper | 4 | (two 1-1 jumps, two 8-8 jumps) |
| Phase | 2 | |
| Neutral | 2 | |
| Total | 15 | |

FIGS. 9A-9F show an illustrative wiring schematic corresponding to parallel windings of one phase of a ten-layer stator, with a winding pitch of six slots, in accordance with some embodiments of the present disclosure. FIGS. 9A-9F are arranged in a 2×3 array to form a composite table, with FIGS. 9A-9C arranged in a 1×3 array, from left to right to form one table, and with FIGS. 9D-9F arranged underneath in a 1×3 array, from left to right to form another table. The winding schematic of FIGS. 9A-9F is arranged with the slots indexed along the horizontal axis and layers indexed along the vertical axis. The paths of windings B1, B2, B3, and B4 are illustrated in FIGS. 9A-9F (e.g., as windings 901-904). As illustrated, hairpins are inserted axially from the bottom of each layer (e.g., the crown side, or lead side), with the leg(s) of the hairpin extending vertically in the corresponding slot(s). As illustrated, welds 910 between legs of hairpins are illustrated on the top (e.g., the weld side), shown by thick line segments. Based on the wiring path of FIGS. 9A-9F, Table 4 shows the number of unique hairpins (e.g., of each type and total number of different shapes).

TABLE 4

Unique hairpins corresponding to FIGS. 9A-9F

| Hairpin Type | Number | Notes |
|---|---|---|
| Regular | 5 | (five sizes for radial position differences) |
| Jumper | 4 | (layer 8-9, 6-7 jump, layer 5-4 jump, layer 3-2 jump) |
| Jumper | 4 | (two 1-1 jumps, two 10-10 jumps) |
| Phase | 2 | |
| Neutral | 2 | |
| Total | 17 | |

FIGS. 10A-10F show an illustrative wiring schematic corresponding to parallel windings of one phase of a six-layer stator, with a winding pitch of six slots, in accordance with some embodiments of the present disclosure. FIGS. 10A-10F are arranged in a 2×3 array to form a composite table, with FIGS. 10A-10C arranged in a 1×3 array, from left to right to form one table, and with FIGS. 10D-10F arranged underneath in a 1×3 array, from left to right to form another table. The winding schematic of FIGS. 10A-10F is arranged with the slots indexed along the horizontal axis and layers indexed along the vertical axis. The paths of windings B1 and B2 are illustrated in FIGS. 10A-10F (e.g., as windings 1001-1002). As illustrated, hairpins are inserted axially from the bottom of each layer (e.g., the crown side, or lead side), with the leg(s) of the hairpin extending vertically in the corresponding slot(s). As illustrated, welds 1010 between legs of hairpins are illustrated on the top (e.g., the weld side), shown by thick line segments. In an illustrative example (not illustrated), phases A1 and A2 are the same as B1 and B2 but are shifted 4 slots (e.g., A1 phase lead starts in slot 17), and phases C1 and C2 are the same as B1 and B2 but are shifted 8 slots (e.g., C1 phase lead starts in slot 21). Based on the wiring path of FIGS. 10A-10F, Table 5 shows the number of unique hairpins (e.g., of each type and total number of different shapes).

TABLE 5

Unique hairpins corresponding to FIGS. 10A-10F

| Hairpin Type | Number | Notes |
|---|---|---|
| Regular | 3 | (three sizes for radial position differences) |
| Jumper | 2 | (layer 5-4 jump, layer 3-2 jump) |
| Jumper | 2 | (two 1-1 jumps) |
| Phase | 1 | |
| Neutral | 1 | |
| Total | 9 | |

FIGS. 11A-11F show an illustrative wiring schematic corresponding to parallel windings of one phase of a ten-layer stator, with a winding pitch of seven slots, in accordance with some embodiments of the present disclosure. FIGS. 11A-11F are arranged in a 2×3 array to form a composite table, with FIGS. 11A-11C arranged in a 1×3 array, from left to right to form one table, and with FIGS. 11D-11F arranged underneath in a 1×3 array, from left to right to form another table. The winding schematic of FIGS. 11A-11F is arranged with the slots indexed along the horizontal axis and layers indexed along the vertical axis. The paths of windings B1, B2, B3, and B4 are illustrated in FIGS. 11A-11F (e.g., as windings 1101-1104). As illustrated, hairpins are inserted axially from the bottom of each layer (e.g., the crown side, or lead side), with the leg(s) of the hairpin extending vertically in the corresponding slot(s). As illustrated, welds 1110 between legs of hairpins are illustrated on the top (e.g., the weld side), shown by thick line segments. For example, the paths of windings B1-B4 are illustrated in FIGS. 1-3. In an illustrative example (not illustrated), phases A1 and A2 are the same as B1 and B2 but are shifted 4 slots (e.g., A1 phase lead starts in slot 17), phases A3 and A4 are the same as B3 and B4 but are shifted 4 slots (e.g., A3 phase lead starts in slot 17), phases C1 and C2 are the same as B1 and B2 but are shifted 8 slots (e.g., C1 phase lead starts in slot 21), and phases C3 and C4 are the same as B3 and B4 but are shifted 8 slots (e.g., C3 phase lead starts in slot 21). Based on the wiring path of FIGS. 11A-11F, Table 6 shows the number of unique hairpins (e.g., of each type and total number of different shapes).

TABLE 6

Unique hairpins corresponding to FIGS. 11A-11F

| Hairpin Type | Number | Notes |
|---|---|---|
| Regular | 5 | (five sizes for radial position differences) |
| Jumper | 4 | (layer 8-9, 6-7, 5-4, and 3-2 jumps) |
| Jumper | 4 | (two 1-1 jumps, two 10-10 jumps) |
| Phase | 2 | |
| Neutral | 2 | |
| Total | 17 | |

FIGS. 12A-12F shows an illustrative wiring schematic corresponding to parallel windings of one phase of a six-layer stator, with a winding pitch of seven slots, in accordance with some embodiments of the present disclosure. FIGS. 12A-12F are arranged in a 2×3 array to form a composite table, with FIGS. 12A-12C arranged in a 1×3 array, from left to right to form one table, and with FIGS. 12D-12F arranged underneath in a 1×3 array, from left to right to form another table. The winding schematic of FIGS. 12A-12F is arranged with the slots indexed along the horizontal axis and layers indexed along the vertical axis. The winding path of each winding of windings B1 and B2 are illustrated in FIGS. 12A-12F (e.g., as windings 1201-1202). As illustrated, hairpins are inserted from the bottom of each layer (e.g., the crown side, or lead side), with the leg(s) of the hairpin extending vertically in the corresponding slot(s). As illustrated, welds 1210 between legs of hairpins are illustrated on the top (e.g., the weld side), shown by thick line segments. For example, the winding paths of windings B1 and B2 are illustrated in FIGS. 4-5. In an illustrative example (not illustrated), windings A1 and A2 (of phase A) are the same as B1 and B2 but are shifted 4 slots (e.g., A1 phase lead starts in slot 18), and windings C1 and C2 (of phase C) are the same as B1 and B2 but are shifted 8 slots (e.g., C1 winding lead starts in slot 22). Based on the wiring path of FIGS. 12A-12F, Table 7 shows the number of unique hairpins (e.g., of each type and total number of different shapes).

TABLE 7

Unique hairpins corresponding to FIGS. 12A-12F

| Hairpin Type | Number | Notes |
|---|---|---|
| Regular | 3 | (three sizes for radial position differences) |
| Jumper | 2 | (layer 5-4 jump, and layer 3-2 jump) |
| Jumper | 2 | (two 1-1 jumps) |
| Phase | 1 | |
| Neutral | 1 | |
| Total | 9 | |

The illustrative winding arrangements of FIGS. 1-12F show some aspects of the present disclosure. For example, the specific slot numbering is only illustrative and the windings illustrated may start at any suitable slot location and layer. Further, the number of slots, number of poles, the number of phases, number of parallel windings in each phase, number of layers, the pole-pitch, or any combination thereof may be any suitable value in accordance with the present disclosure. In addition, whether each winding starts at the highest or lowest indexed layer is merely illustrative. In some embodiment, for example, the winding paths of B1 and B2 of FIGS. 9A-9F can start at the innermost layer as opposed to the outermost layer.

Figure 13:
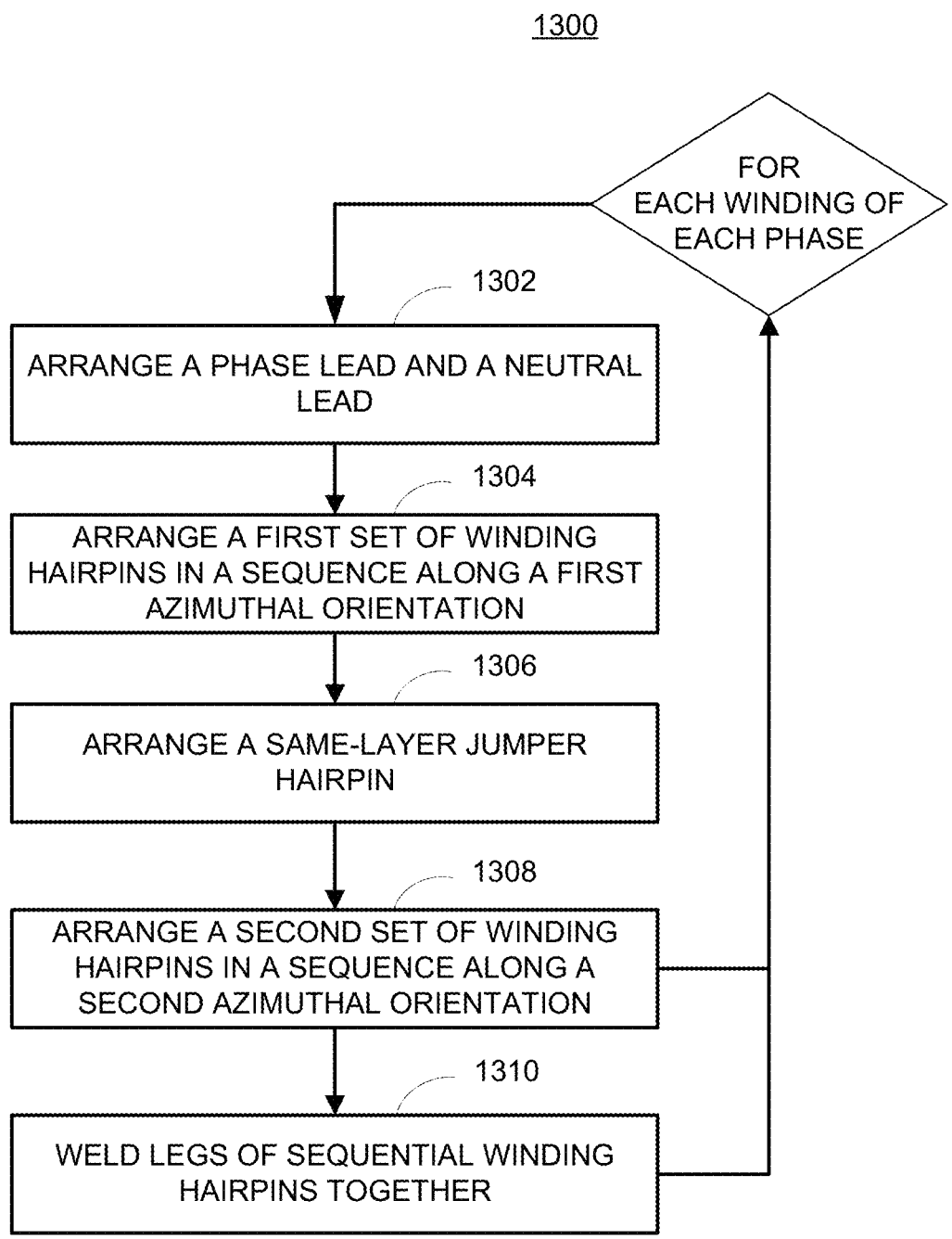
FIG. 13 shows a flowchart of an illustrative process for making a motor stator having balanced windings, in accordance with some embodiments of the present disclosure.

FIG. 13 shows a flowchart of illustrative process 1300 for making a motor stator having balanced windings, in accordance with some embodiments of the present disclosure. In an illustrative example, any of the stators or winding arrangements of FIGS. 1-12F, or any other suitable stator, may be wound using process 1300. The illustrative steps of process 1300 may be performed in any suitable order, in accordance with the present disclosure. For example, steps 1302 and 1308 may be performed at the same time, sequentially in any suitable order, or a combination thereof. In a further example, step 1310 may be performed in increments (e.g., after each of steps 1302-1308 or at any suitable intermediate stage in assembly). Process 1300 may be repeated for each phase, each winding of each phase (e.g., where multiple windings are coupled in parallel to form a phase), or a combination thereof. To illustrate, each of windings B1-B4 of FIGS. 1-3 may be wound using process 1300, and windings B1-B4 may be electrically coupled in parallel to form the "B" phase of the motor (e.g., and process 1300 may be repeated for the "A" and "C" phases).

Step 1302 includes arranging a phase lead and a neutral lead in respective slots of a stator. In some embodiments, the phase lead and neutral lead are inserted into respective slots axially. In some embodiments, step 1302 includes bending the inserted leads after insertion (e.g., to position the ends of the leads for welding). In some embodiments, the phase lead and the neutral lead each include one leg, which is inserted into the respective slot.

Step 1304 includes arranging a first set of winding hairpins in respective slots of a stator, in a sequence along a first azimuthal orientation. In some embodiments, each winding hairpin is inserted into respective slots axially. In some embodiments, step 1304 includes bending the inserted leads after insertion (e.g., to position the ends of the leads for welding). The first azimuthal orientation may be either clockwise or counter-clockwise. In some embodiments, the first set of winding hairpins may include jumpers that span one or more layers. In some embodiments, the first set of winding hairpins each include the same span (e.g., span the same number of slots).

Step 1306 includes arranging a same-layer jumper hairpin in respective slots of a stator. In some embodiments, the same layer jumper is arranged in the radially innermost layer. In some embodiments, the same layer jumper is arranged in the radially outermost layer. The same-layer jumper may include the same span, a shorter span, or a longer span than the first set of winding hairpins.

Step 1308 includes arranging a second set of winding hairpins in respective slots of a stator, in a sequence along a second azimuthal orientation. In some embodiments, each winding hairpin is inserted into respective slots axially. In some embodiments, step 1308 includes bending the inserted leads after insertion (e.g., to position the ends of the leads for welding). The second azimuthal orientation may be either clockwise or counter-clockwise, whichever is opposite to the direction of step 1304. In some embodiments, the second set of winding hairpins may include jumpers that span one or more layers. In some embodiments, the second set of winding hairpins each include the same span (e.g., span the same number of slots). In some embodiments, each winding hairpin of the first set and the second set include the same span (e.g., seven slots as illustrated in FIGS. 1-5, or any other suitable number of slots).

Step 1310 includes welding legs of sequential winding hairpins together. Step 1310 may include contact welding, laser welding, friction welding, soldering, brazing, crimping, joining using any other suitable technique, or any combination thereof.

In an illustrative example, each winding applied using process 1300 may follow a path from outer to inner (e.g., and vice versa for 10 layer winding), then make a same layer jump, and then return back to the outer or inner by changing the winding direction (e.g., azimuthal direction), rather than starting at an outer or inner layer and ending at the opposite radial side (e.g., inner or outer, respectively). In a further illustrative example, for some ten-layer and eight layer arrangements, each the winding need not complete each layer before jumping to the next layer.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A stator of an electric motor, the stator comprising:
   a plurality of motor teeth forming a plurality of slots, wherein each slot is configured to accommodate N layers, wherein N is an integer;
   a phase lead and a neutral lead arranged in a first layer;
   a first set of winding hairpins each configured to achieve a span of M slots, wherein the first set of winding hairpins are coupled in series and coupled to the phase lead, and wherein the first set of winding hairpins are arranged sequentially in a first azimuthal direction;
   a single hairpin jumper having first and second legs inserted into slots of a second layer, wherein the first leg of the single hairpin jumper is coupled in series with the first set of winding hairpins; and
   a second set of winding hairpins each configured to achieve the span of M slots, wherein the second set of winding hairpins are coupled in series between the second leg of the single hairpin jumper and the neutral lead, wherein the second set of winding hairpins are arranged sequentially in a second azimuthal direction opposite to the first azimuthal direction, and wherein the first set of winding hairpins, the single hairpin jumper, and the second set of winding hairpins form a continuous electrical path between the phase lead and the neutral lead.

2. The stator of claim 1, wherein the single hairpin jumper is configured to achieve the span of M slots.

3. The stator of claim 1, wherein the single hairpin jumper is configured to achieve a shorter span less than the span of M slots.

4. The stator of claim 1, wherein M is equal to seven slots such that seven stator teeth are arranged between legs of each of the first set of winding hairpins and between legs of each of the second set of winding hairpins.

5. The stator of claim 4, wherein:
   the plurality of slots comprises 48 slots;
   the phase lead, the neutral lead, the first set of winding hairpins, the single hairpin jumper, and the second set of winding hairpins correspond to a first winding of a first phase, the stator further comprising windings corresponding to two additional phases.

6. The stator of claim 1, wherein the first layer is a radially outermost layer, and wherein the second layer is a radially innermost layer.

7. The stator of claim 1, wherein the first layer is a radially innermost layer, and wherein the second layer is a radially outermost layer.

8. A stator of an electric motor, the stator comprising:
a plurality of slots;
a plurality of phases arranged in the slots, each phase comprising:
a first set of winding hairpins coupled in series and arranged sequentially in a first azimuthal direction;
a second set of winding hairpins coupled in series and arranged sequentially in a second azimuthal direction opposite the first azimuthal direction, wherein each of the first set of winding hairpins and each of the second set of winding hairpins comprise a span of M slots; and
a single hairpin jumper having first and second legs inserted into slots of a single layer, wherein the first leg of the single hairpin jumper is coupled in series with the first set of winding hairpins and the second leg of the single hairpin jumper is coupled in series with the second set of winding hairpins.

9. The stator of claim 8, wherein the first set of winding hairpins, the second set of winding hairpins and the single hairpin jumper correspond to a first continuous winding, and wherein each phase comprises a second continuous winding coupled in parallel with the first continuous winding, each second continuous winding comprising:
a third set of winding hairpins coupled in series and arranged sequentially in the first azimuthal direction;
a fourth set of winding hairpins coupled in series and arranged sequentially in the second azimuthal direction, wherein each of the third set of winding hairpins and each of the fourth set of winding hairpins comprise a span of M slots; and
another single hairpin jumper arranged in a single layer, wherein a first leg of the another single hairpin jumper is coupled in series with the third set of winding hairpins and a second leg of the another single hairpin jumper is coupled in series with the fourth set of winding hairpins.

10. The stator of claim 9, wherein the single hairpin jumper is configured to achieve the span of M slots, and wherein the another single hairpin jumper is configured to achieve a shorter span of less than M slots.

11. The stator of claim 8, wherein M is equal to seven slots such that seven stator teeth are arranged between legs of each first set of winding hairpins and between legs of each second set of winding hairpins.

12. The stator of claim 8, wherein the single layer is a radially outermost layer.

13. The stator of claim 8, wherein the single layer is a radially innermost layer.

14. The stator of claim 8, wherein the plurality of phases comprises three phases, wherein each phase of the three phases comprises at least two windings coupled in parallel, and wherein the first set of winding hairpins, the second set of winding hairpins, and the single hairpin jumper are included in a first winding of the at least two windings.

15. A stator of an electric motor, the stator comprising:
a plurality of stator teeth forming a plurality of slots, wherein each slot is configured to accommodate N layers, wherein N is an even integer;
a plurality of winding hairpins each configured to achieve a span, wherein the plurality of winding hairpins comprise N/2 subsets of winding hairpins, and wherein each subset of the N/2 subsets comprises a respective length corresponding to the span;
a plurality of jumper hairpins each configured to achieve the span, wherein the plurality of jumper hairpins comprise N/2-1 subsets of jumper hairpins, and wherein each subset of the N/2-1 subsets comprises a respective length corresponding to the span; and
a single hairpin jumper having first and second legs inserted into slots of a single layer of the N layers, wherein the plurality of winding hairpins, the plurality of jumper hairpins, and the single hairpin jumper are coupled in series to form a continuous electrical path of a phase.

16. The stator of claim 15, wherein the single layer is a radially outermost layer.

17. The stator of claim 15, wherein the single layer is a radially innermost layer.

18. The stator of claim 15, wherein the single hairpin jumper is configured to achieve the span.

19. The stator of claim 15, wherein the single hairpin jumper is configured to achieve a short span less than the span.

20. The stator of claim 15, wherein the plurality of winding hairpins, the plurality of jumper hairpins, and the single hairpin jumper form a sequence, wherein the single hairpin jumper is arranged at the center of the sequence, and wherein the single hairpin jumper corresponds to a change in azimuthal winding direction of the plurality of winding hairpins and the plurality of jumper hairpins.

* * * * *